United States Patent [19]

Yokoyama et al.

[11] Patent Number: 4,995,359

[45] Date of Patent: Feb. 26, 1991

[54] COMBUSTION CHAMBER FOR INTERNAL COMBUSTION ENGINE

[75] Inventors: Junichi Yokoyama; Tomonori Urushihara, both of Yokosuka; Teruyuki Itoh, Tokyo; Hiroyuki Fujii, Yokosuka, all of Japan

[73] Assignee: Nissan Motor Co., Ltd., Yokohama, Japan

[21] Appl. No.: 372,245

[22] Filed: Jun. 27, 1989

[30] Foreign Application Priority Data

Jun. 28, 1988 [JP] Japan .................. 63-160210

[51] Int. Cl.$^5$ ............................................ F02M 35/10
[52] U.S. Cl. .............................. 123/188 M; 123/308
[58] Field of Search ................. 123/308, 432, 188 M

[56] References Cited

U.S. PATENT DOCUMENTS 4,838,219 6/1989 Feuling .................. 123/188 M

Primary Examiner—E. Rollins Cross
Attorney, Agent, or Firm—Foley & Lardner, Schwartz, Jeffery, Schwaab, Mack, Blumenthal & Evans

[57] ABSTRACT

To smoothly introduce intake air or mixture through at least one intake valve and exhaust combustion gas through at least exhaust valve, an intake side conical wall surface is formed in an inner wall of the cylinder head in smooth continuous connection with a conical surface formed at an end of the intake valve seat, and an exhaust side conical wall surface is also formed in the inner wall of the cylinder head in smooth continuous connection with a conical surface formed at an end surface of the exhaust valve seat. It is preferable not to allow liquid fuel introduced through the intake to flow directly toward an ignition plug provided at the center of the cylinder, but to allow the introduced liquid fuel to flow directly toward the exhaust port along a flat surface, recess, groove, guide surface, etc. formed around the ignition plug for prevention of misfiring. Further, it is preferable to form a recess on a top surface of the piston, project the ignition plug from inner surface of the cylinder head, incline ignition plug toward the exhaust port, obstruct liquid introduced through the intake valve by a boundary projection formed between the intake and exhaust side conical wall surfaces, etc.

26 Claims, 25 Drawing Sheets

COMBUSTION CHAMBER FOR INTERNAL COMBUSTION ENGINE

BACKGROUND OF THE INVENTION

1. Field of the Invention

The present invention relates to a combustion chamber for internal combustion engines and more specially to an inner wall surface shape of the combustion chamber.

2. Description of the Prior Art

In order to allow intake air and combustion gas to smoothly flow into or from a combustion chamber for an internal combustion engine, the shape of the inner wall surface of the combustion chamber is important. With a view to improving the charging efficiency, the same applicant has already proposed a combustion chamber for an internal combustion engine in Japanese Published Examined (Kokoku) Utility Model Application No. 51-21203. In this prior-art combustion chamber, as shown in FIG. 1A, an end surface 131 of a valve seat onto which an intake valve 130 is seated and an inner wall surface 132 on the cylinder head side are connected smoothly through a continuous spherical surface, so that whenever the intake valve 130 is opened, intake air can smoothly flow along the valve seat end surface 131 and then the spherical inner wall surface 132 under a low flow resistance.

In the prior-art combustion chamber shown in FIG. 1A, however, there still exists a problem in that vortexes are easily produced along the inner wall surface of the combustion chamber on the cylinder head side as shown in FIGS. 1B and 1C, and therefore the charging efficiency drops. The reason is as follows: when the inner wall surface 132 is formed so as to be curved by a small radius R1 in contact with the valve seat end surface 131, an angle $\theta$ subtended by a tangent line A on the inner wall surface and the central line $O_{130}$ of the intake valve 130 decreases as the tangent line A moves from that A1 ($\theta_1$) near the valve seat end surface 131 to that A2 ($\theta_2$) remote from the same end surface 131, as shown in FIG. 1B, so that vortices are produced due to contraction or compression at positions remote from the valve seat end surface 131.

On the other hand, when the inner wall surface 132 is formed so as to be curved by a large radius R2 larger than R1, an angle $\theta$ subtended by a tangent line A on the inner wall surface and the central line $O_{130}$ of the intake valve 130 increases as the tangent line A moves from that A1 ($\theta_1$) near the valve seat end surface 131 to that A3 ($\theta_3$) remote from the same end surface 131, as shown in FIG. 1C, so that vortices are produced due to separation or expansion at positions remote from the valve seat end surface 131.

SUMMARY OF THE INVENTION

With these problems in mind, therefore, it is the primary object of the present invention to provide a combustion chamber for an internal combustion engine which can prevent vortices from being produced along the inner wall surface of the combustion chamber whenever intake air is introduced through intake valves or combustion gas is exhausted through exhaust valves.

To achieve the above-mentioned object, a combustion chamber for an internal combustion engine having a cylinder, a cylinder head, a piston, at least one intake valve set for supporting an intake valve at an intake port, at least one exhaust valve seat for supporting an exhaust valve at an exhaust port, and an ignition plug according the present invention, characterized in that an intake side conical wall surface is formed in an inner wall of the cylinder head in continuous connection with a conical surface formed at an end of the intake valve seat to smoothly introduce intake air into the cylinder through the intake valve and/or an exhaust side conical wall surface is formed in an inner wall of the cylinder head in continuous connection with a conical surface formed at an end surface of the exhaust valve seat to smoothly exhaust combustion gas from the cylinder through the exhaust valve.

In the combustion chamber according to the present invention, since a conical surface is formed straight in cross section in continuous smooth connection with a conical surface formed at an end of the intake valve seat, intake air can be introduced smoothly through the intake valve into the combustion chamber along the conical intake valve seat end surface and then the intake side conical wall surface without producing vortices along the inner wall of the combustion chamber, thus improving the charging efficiency.

Similarly, since a conical surface is formed straight in cross section in continuous smooth connection with a conical surface formed at an end of the exhaust valve seat, combustion gas can be exhausted smoothly through the exhaust valve from the combustion chamber along the conical exhaust valve seat end surface and then the exhaust side conical wall surface without producing vortices along the inner wall of the combustion chamber, thus improving the discharging efficiency.

The apex of the intake or exhaust side conical wall surface matches the apex of the conical surface formed at the end surface of the intake or exhaust valve seat, or offset inside away from the central line of a stem of the intake or exhaust valve when seen along the axial direction of the cylinder but radially outside away from the central line when seen along a radial direction of the cylinder for prevention of misfiring.

Further, various countermeasures are taken against misfiring of the ignition plug caused by dampness of introduced liquid fuel as follows:

The top surface of the piston is formed with a circular, semicircular or annular recess at the center thereof to effectively swirl ignited mixture.

The central line of the stem of the intake valve is preferably inclined radially outside away from a middle line of the combustion chamber when seen along an axial direction of the cylinder. The central line of the stem of the exhaust valve is preferably inclined radially outside or inside away from a middle line of the combustion chamber when seen along an axial direction of the cylinder.

The ignition plug is disposed so as to project from an inner wall surface of the cylinder head at the boundary between the intake and exhaust side conical wall surfaces or incline toward the exhaust valve.

A flat surface is formed in the inner wall of the cylinder head and around the ignition plug in parallel to the top surface of the piston to allow liquid fuel to directly flow to the exhaust side conical wall surface therealong. Further, a guide surface whose radius of curvature is smaller than that of the intake side conical wall surface is formed between the flat surface and the intake side conical wall surface at a sectorial area defined by an apex of the intake side conical wall surface and a sector angle including the ignition plug at its center to allow liquid fuel to directly flow to the exhaust valve therealong.

A boundary between the intake side conical wall surface and the exhaust side conical wall surface is formed near the cylinder center, and an ignition plug is disposed at a position away from the cylinder center so as to be directed toward the cylinder center so that liquid fuel introduced through the intake port is obstructed by the boundary from flowing directly to the ignition plug.

An apex angle of the intake or exhaust side conical wall surface is determined equal to an apex angle of a poppet valve head of the intake or exhaust valve, respectively, to more smoothly pass air or gas through the intake or exhaust valve. Further, an ignition plug provided with two opposing spark gaps formed by two opposing side electrodes and a central cylindrical electrode is disposed at a boundary between the two intake side conical wall surfaces to effectively swirl ignited mixture.

DETAILED DESCRIPTION OF THE PREFERRED EMBODIMENTS

Embodiments of the present invention will be described hereinbelow with reference to the attached drawings. A first basic embodiment will be described with reference to FIGS. 2A and 2B.

Figure 1A:
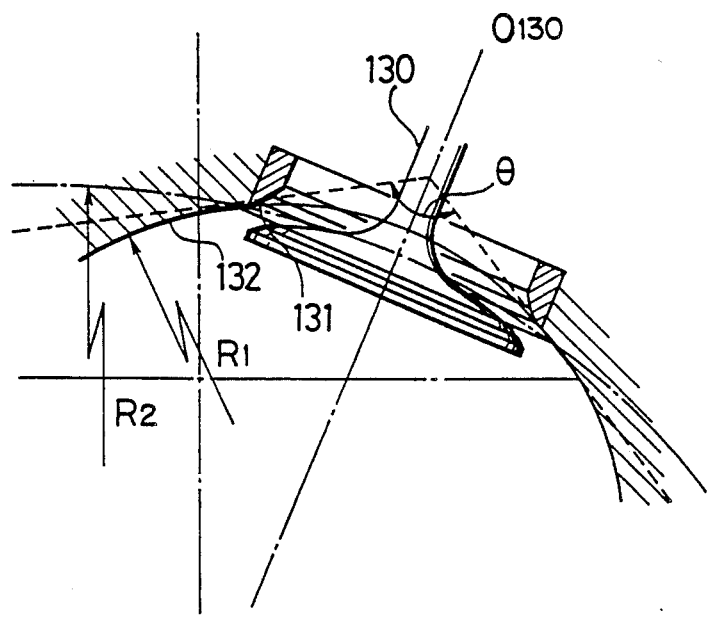
FIG. 1A is a cross-sectional view showing a prior-art combustion chamber wall of a cylinder head.
Figure 1B:
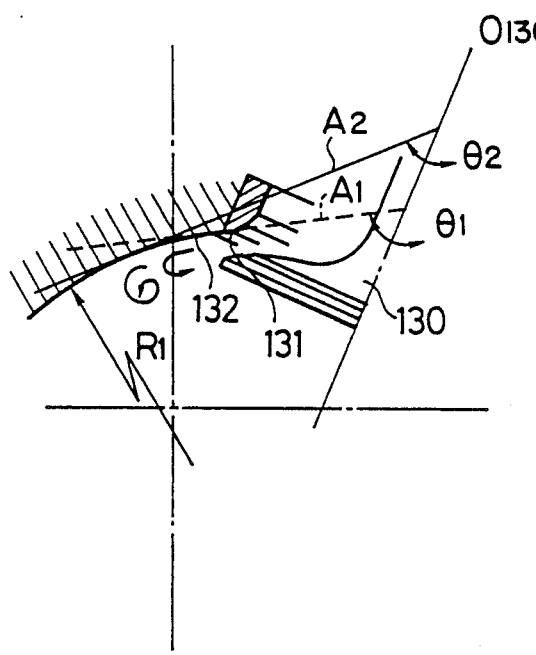
FIG. 1B is a similar cross-sectional view for assistance in explaining vortices produced due to contraction in the prior-art combustion chamber.
Figure 1C:
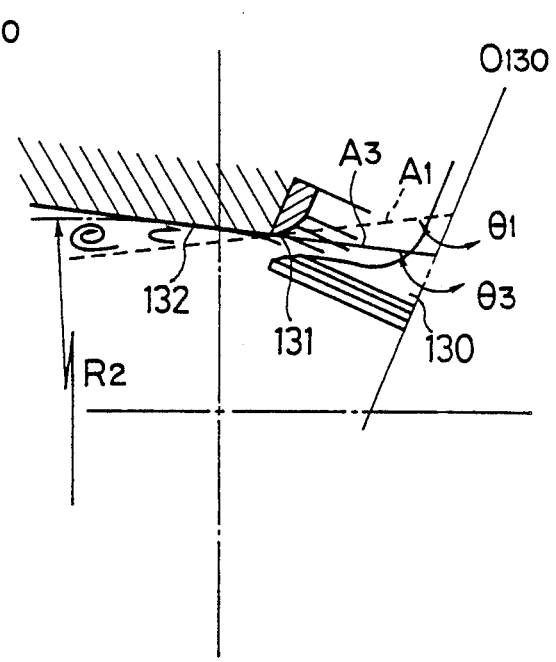
FIG. 1C is a similar cross-sectional view for assistance in explaining vortices produced due to separation in the prior-art combustion chamber.
Figure 2A:
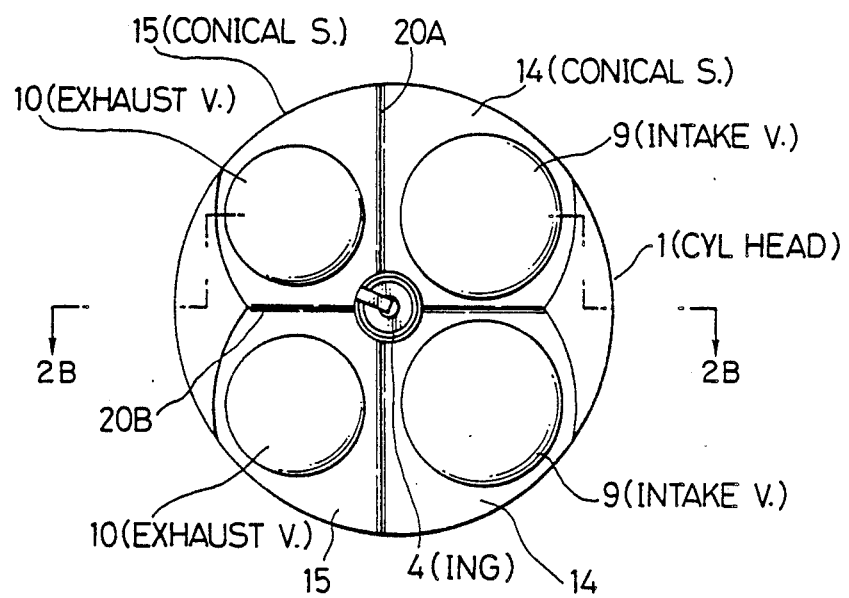
FIG. 2A is a plan view showing a combustion chamber wall on the cylinder head side, for assistance in explaining a first embodiment according to the present invention.
Figure 2B:
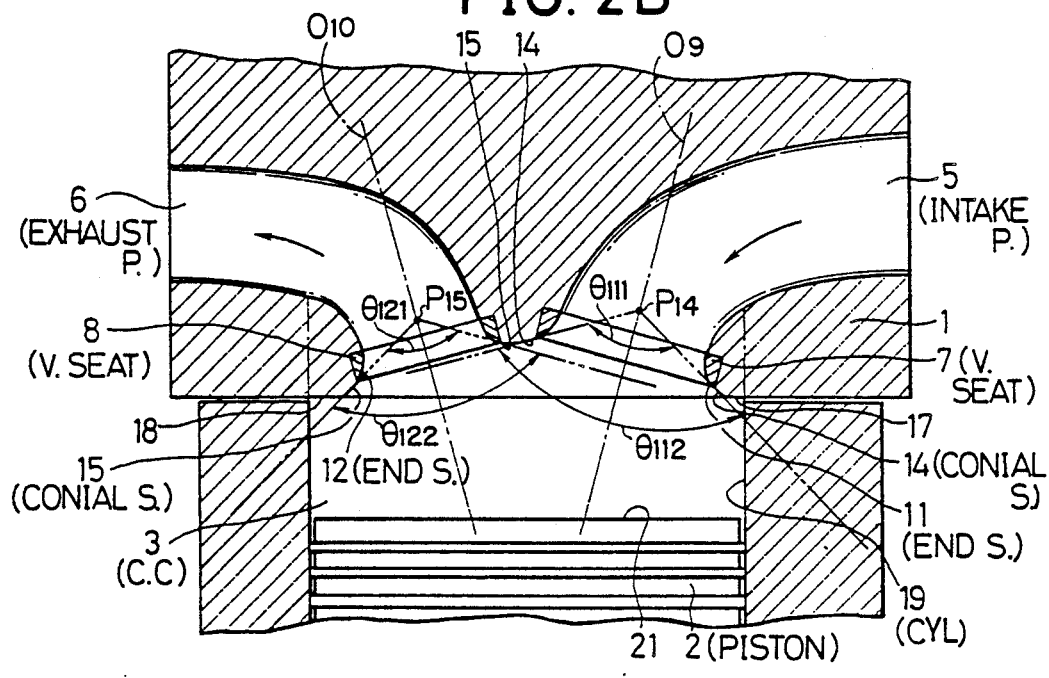
FIG. 2B is an enlarged cross-sectional view taken along the line 2B—2B in FIG. 2A.

FIG. 2A shows a top view showing a cylinder head 1 of vent roof type, in which two intake valves 9 and two exhaust valves 10 are arranged on top of the cylinder head 1, and further, an ignition plug 4 is disposed at the center of the cylinder head 1. FIG. 2B shows a cross-sectional view taken along the lines 2B—2B shown in FIG. 2A, in which a pair of intake port 5 and exhaust port 6 are arranged so as to be opposed to each other over a piston 2.

In FIG. 2B, an intake valve seat 7 (to which an intake valve 9 is seated) is provided at the innermost end of the intake port 5, and an exhaust valve seat 8 (to which an exhaust valve 10 is seated) is provided at the innermost end of the exhaust port 6. An inner seat end surface 11 of the intake valve seat 7 is formed by a conical surface defined by an apex $P_{14}$ on the central line $O_9$ of the intake valve 9 and a first predetermined angle $\theta_{111}$.

Further, an intake side conical wall surface 14 is formed in an inner wall of the cylinder head 1 in continuous smooth connection with the conical surface 11 formed at an end of the intake valve seat to smoothly introduce intake air into the cylinder through the intake valve without producing vortices along the inner cylinder head wall. The intake side conical wall surface 14 is defined by the apex $P_{14}$ on the central line $O_9$ of the intake valve 9 and a second predetermined angle $\theta_{112}$. Although it is preferable that the angle $\theta_{111}$ is equal to the angle $\theta_{112}$ to more effectively prevent vortices from being produced, no specific problem develops even if there exists a slight difference between the two angles $\theta_{111}$ and $\theta_{112}$.

Similarly, in FIG. 2B, an inner seat end surface 12 of the exhaust valve seat 8 is formed by a conical surface defined by an apex $P_{15}$ on the central line $O_{10}$ of the exhaust valve 10 at a third predetermined angle $\theta_{121}$.

Further, an exhaust side conical wall surface 15 is formed in an inner wall of the cylinder head 1 in continuous smooth connection with the conical surface 12 formed at an end of the exhaust valve seat to smoothly exhaust combustion gas from the cylinder through the exhaust valve without producing vortices along the inner cylinder head wall. The exhaust side conical wall surface 15 is defined by the apex $P_{15}$ on the central line $O_{10}$ of the exhaust valve 10 and a fourth predetermined angle $\theta_{122}$. Although it is preferable that the angle $\theta_{121}$ is equal to the angle $\theta_{122}$ to more effectively prevent vortices from being produced, no specific problem develops even if there exists a slight difference between the two angles $\theta_{121}$ and $\theta_{122}$.

Therefore, a boundary line 20A between the two intake and exhaust valve side conical wall surfaces 14 and 15 and a boundary line 20B between the two intake or exhaust side conical wall surfaces 14 or 15 form two cross-shaped projections over the piston 2. Further, a first squish area 17 is formed outside the intake valve side conical surface 11 (on the right side) and a second squish area 18 is formed outside the exhaust valve side conical surface 15 (on the left side), both in an inner wall of the combustion chamber 3, and both in parallel to a top surface 21 of the piston 2.

The operation of the combustion chamber 3 according to the present invention will be described hereinbelow. When the intake valve 9 is moved away from the intake valve seat 7 at suction stroke, intake air is introduced into the combustion chamber 3 through the intake port 5. In this embodiment, although the intake air flows along the inner seat end surface 11 of the intake valve seat 7 and the intake side conical wall surface 14, since the conical wall surface 14 is formed straight in cross section in continuous connection to the inner seat end conical surface 11, the introduced intake air can smoothly flow into the combustion chamber 3 without producing vortices due to contraction (compression) or expansion (separation) of the intake air along the conical wall surface 14, thus it being possible to improve the charging efficiency of intake air.

Similarly, when the exhaust valve 10 is moved away from the exhaust valve seat 8 at exhaust stroke, combustion gas is exhausted from the combustion chamber 3 through the exhaust port 6. In this embodiment, although the combustion gas flows along the exhaust side conical wall surface 15 and the inner end conical surface 12 of the exhaust valve seat 8, since the conical end surface 12 is formed straight in cross section in continuous connection to the conical wall surface 15, the combustion gas can smoothly flow out of the combustion chamber 3 without producing vortices due to contraction or expansion of the combustion gas along the conical surface 15, thus it being possible to improve the discharging efficiency of exhaust gas. Since the volume of residual gas can be reduced, it is possible to improve the combustion efficiency under low load or during idling operation, while reducing the temperature of the cylinder 19.

Figure 3:
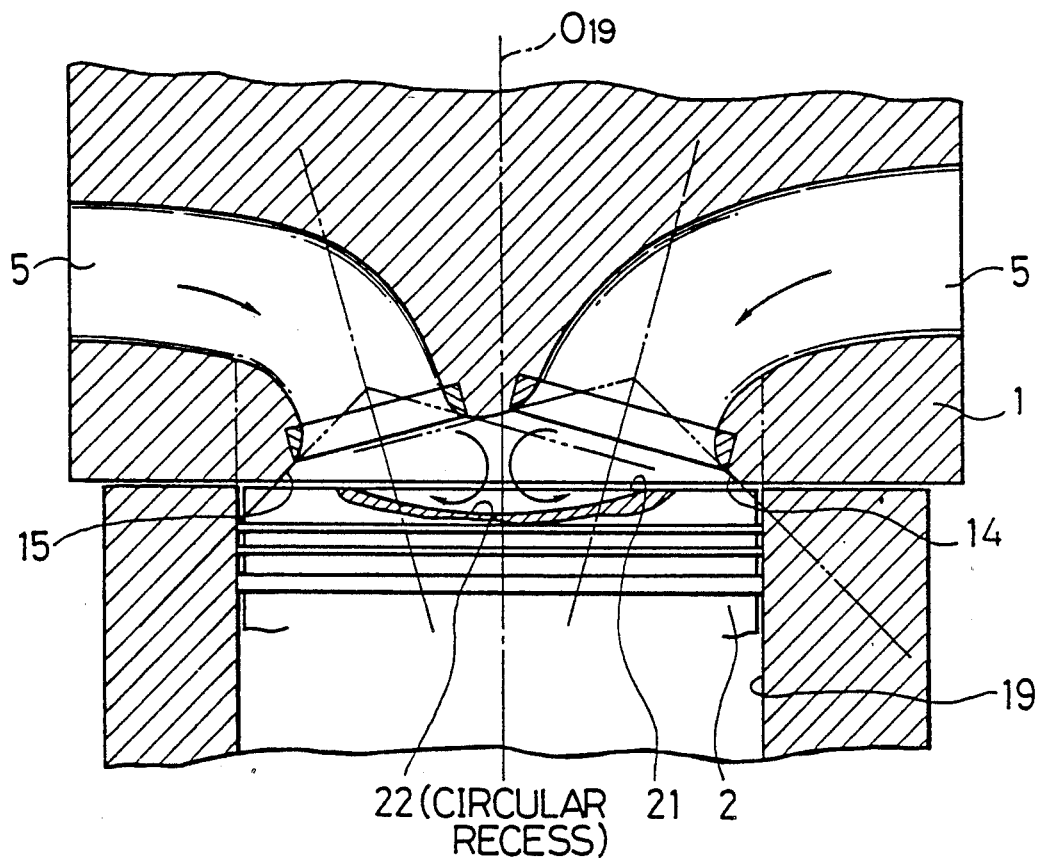
FIG. 3 is a similar enlarged cross-sectional view showing a piston, for assistance in explaining a second embodiment according to the present invention.

FIG. 3 shows a second embodiment of the present invention, in which a spherical circular recess 22 is formed on a top surface 21 of the piston 2. The presence of this spherical circular recess 22 causes ignited mixture to swirl, with the axial line $O_{19}$ of the cylinder as its center, within a space formed between the two inner conical wall surfaces 14 and 15 of the cylinder head 1 and the spherical circular recess 22 of the piston, as shown by arrows, whenever the piston 2 moves upward at compression stroke. This swirl serves to quickly and outwardly spread flames caused by the ignition plug from the central line $O_{19}$ so that it is possible to prevent ignition delay or to increase combustion speed.

Figure 4A:
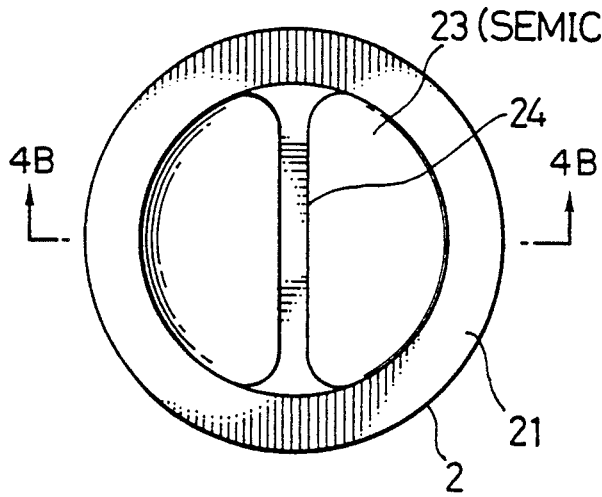
FIG. 4A is a plan view showing a piston for assistance in explaining a first modification of the second embodiment.
Figure 4B:
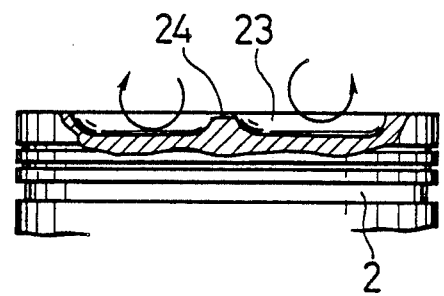
FIG. 4B is a cross-sectional view taken along the line 4B—4B in FIG. 4A.

FIGS. 4A and 4B show a first modification of the second embodiment, in which two semicircular recesses 23 with a constant depth are firmed on the top surface 21 of the piston 2 on both the sides of a middle straight projection 24. In this modification, the ignited mixture swirls strongly on both the sides of the projection 24 along the radial direction.

Figure 5A:
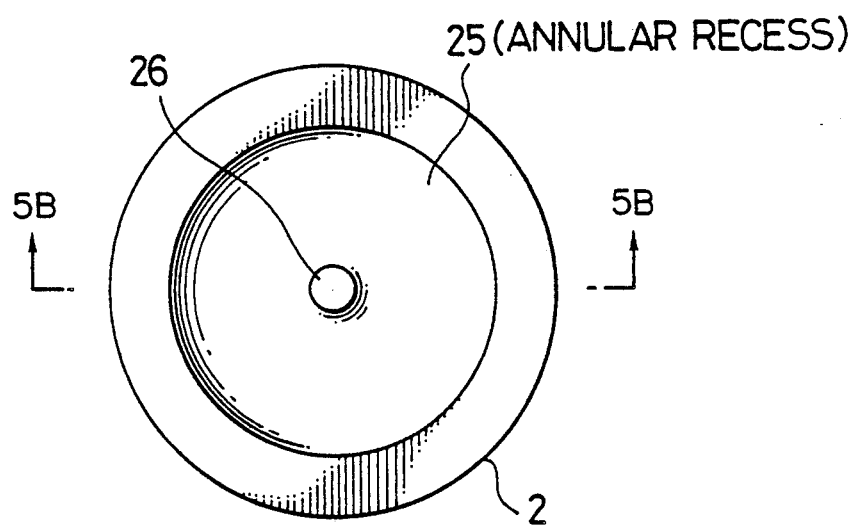
FIG. 5A is a plan view showing a piston for assistance in explaining a second modification of the second embodiment.
Figure 5B:
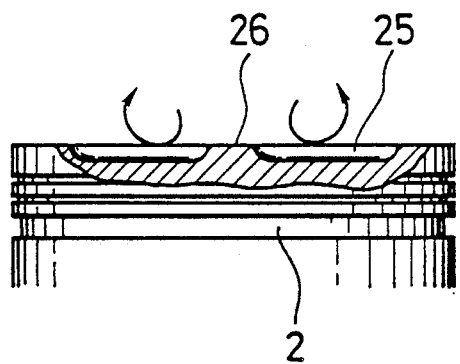
FIG. 5B is a cross-sectional view taken along the line 5B—5B in FIG. 5A.

FIGS. 5A and 5B show a second modification of the second embodiment, in which an annular recess 25 with a constant depth and a small diameter circular projection 26 are formed on the top surfaced 21 of the piston 2. In this modification, the ignited mixture swirls strongly around the circular projection 16 along the radial direction.

Figure 6A:
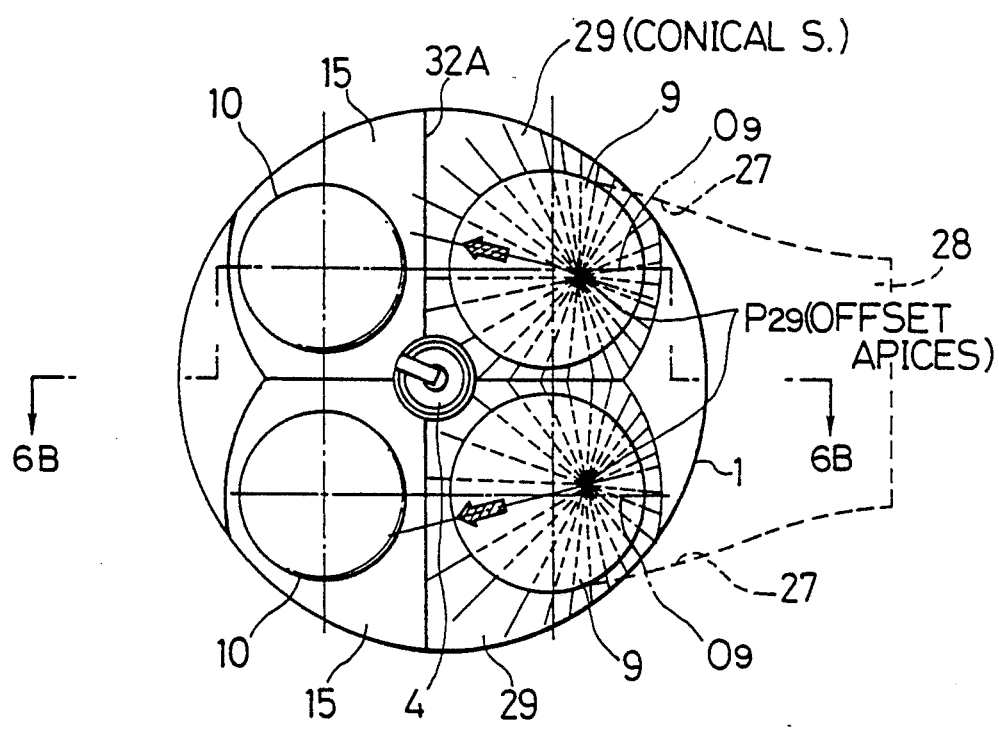
FIG. 6A is a plan view showing a combustion chamber wall on the cylinder head side, for assistance in explaining a third embodiment according to the present invention.
Figure 6B:
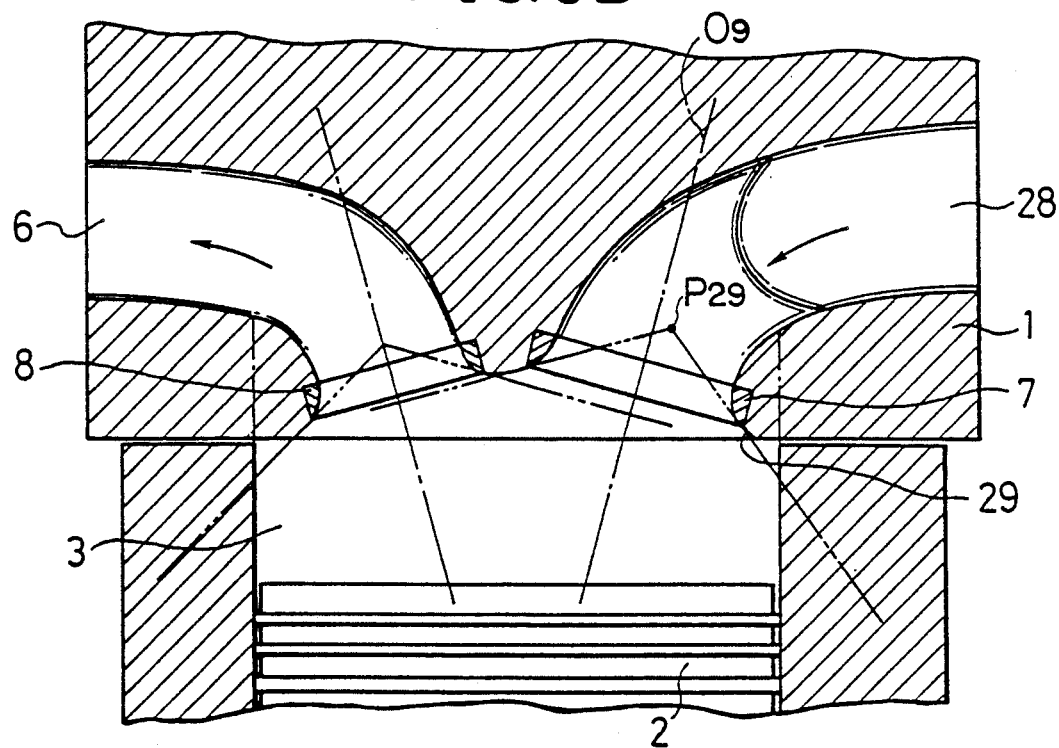
FIG. 6B is an enlarged cross-sectional view showing a cylinder head, taken along the line 6B—6B in FIG. 6A.

FIGS. 6A and 6B show a third embodiment of the present invention. In this embodiment, an intake port 28 is divided into two Siamese (similar or twin) type ports 27, and the intake side conical wall surface 29 in continuous connection with the conical end surface of the intake valve seat 7 is formed by offsetting an apex $P_{29}$ of the conical surface 29 inside away from a central line $O_9$ of a stem of the intake valve when seen along the axial direction of the cylinder (in FIG. 6A) but radially outside away from the central line $O_9$ when seen along the radial direction of the cylinder (in FIG. 6B).

Since the two ports 27 and the conical wall surfaces 29 are both formed inclined radially outside away from the middle line of the combustion chamber so as to be directed to the inside outer circumference of the combustion chamber 3, the intake air introduced into the combustion chamber 3 when the intake valve 9 is moved away from the valve seat flows mainly toward the inside outer circumference of the combustion chamber 3 as shown by thick arrows in FIG. 6A. Therefore, it is possible to prevent the mixture from being concentrated at the ignition plug 4 when the engine is being idled or operating under a high load; that is, to prevent misfiring of the ignition plug 4 caused by dampness of introduced liquid fuel.

Figure 7A:
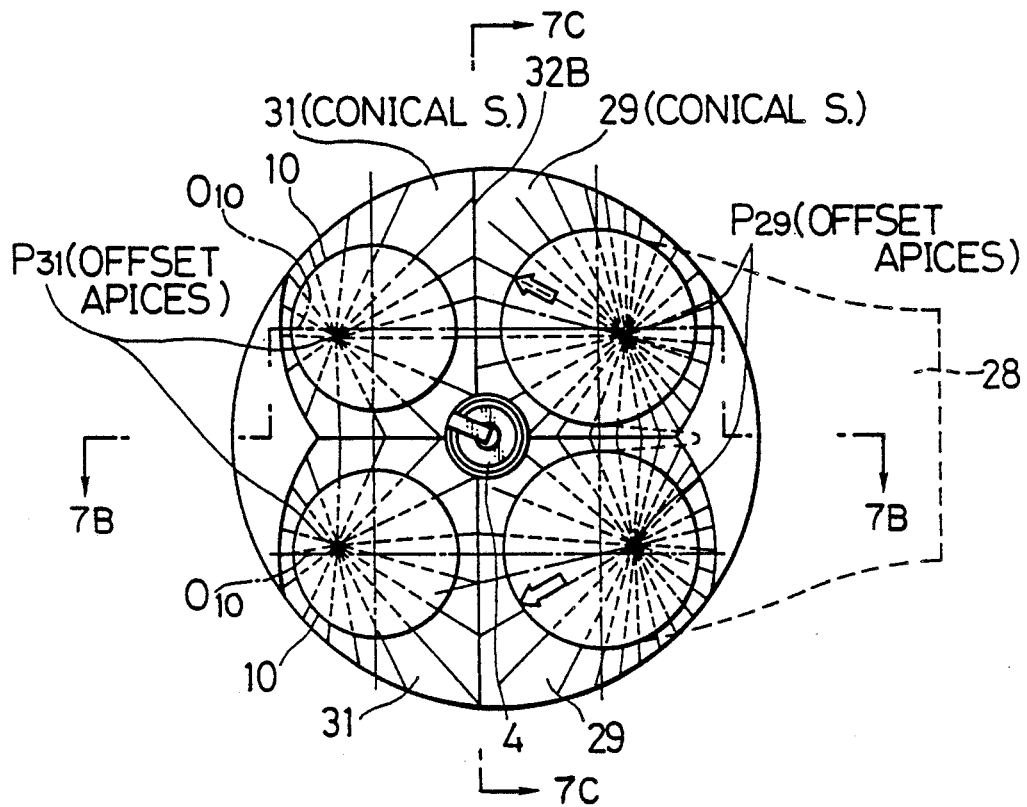
FIG. 7A is a plan view showing a combustion chamber wall on the cylinder head side, for assistance in explaining a fourth embodiment according to the present invention.
Figure 7B:
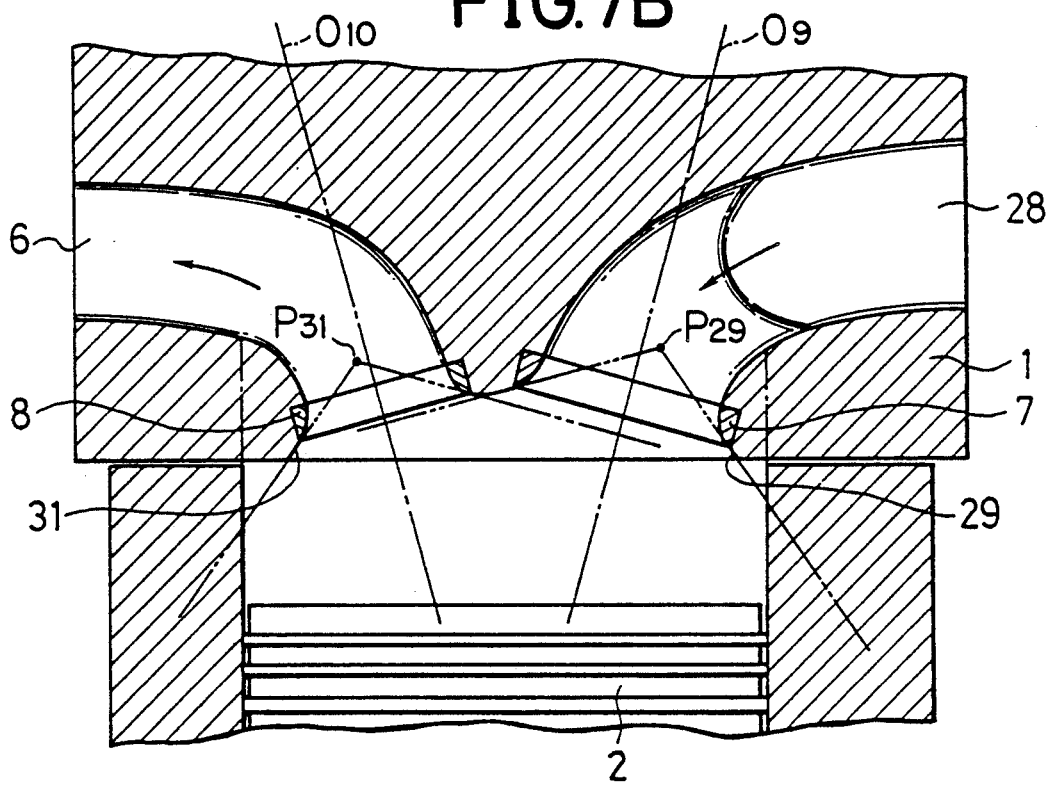
FIG. 7B is an enlarged cross-sectional view showing a cylinder head, taken along the line 7B—7B in FIG. 7A.
Figure 7C:
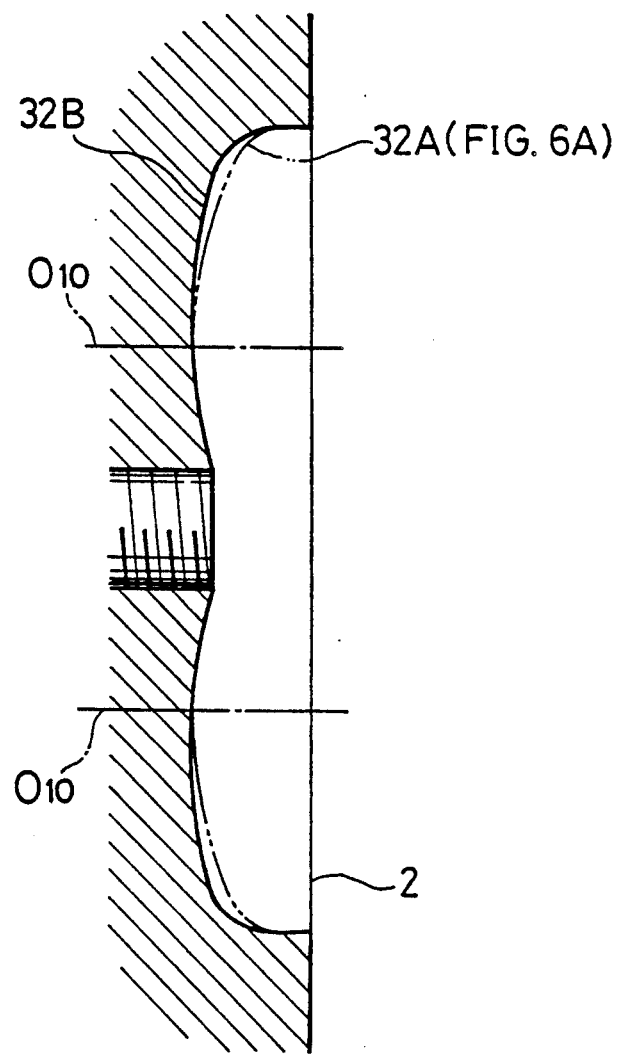
FIG. 7C is a cross-sectional view taken along the line 7C—7C in FIG. 7A.

FIGS. 7A, 7B and 7C show a fourth embodiment of the present invention. In this embodiment, the exhaust side conical wall surface 31 in continuous connection with the conical end surface of the exhaust valve 8 is formed by offsetting an apex $P_{31}$ of the conical surface 31 inside away from a central line $O_{10}$ of a stem of the exhaust valve when seen along the axial direction of the cylinder (in FIG. 7A) but radially outside away from the central line $O_{10}$ when seen along the radial direction of the cylinder (in FIG. 7B).

In this embodiment, since the boundary line 32B between the two conical wall surfaces 29 and 31 of the combustion chamber 3 is located further outward away from the ignition plug 4, as shown in FIG. 7C, as compared with the boundary line 32A (shown in FIG. 6A) of the third embodiment, it is possible to further effectively prevent the mixture from being concentrated at the ignition plug 4.

Figure 8A:
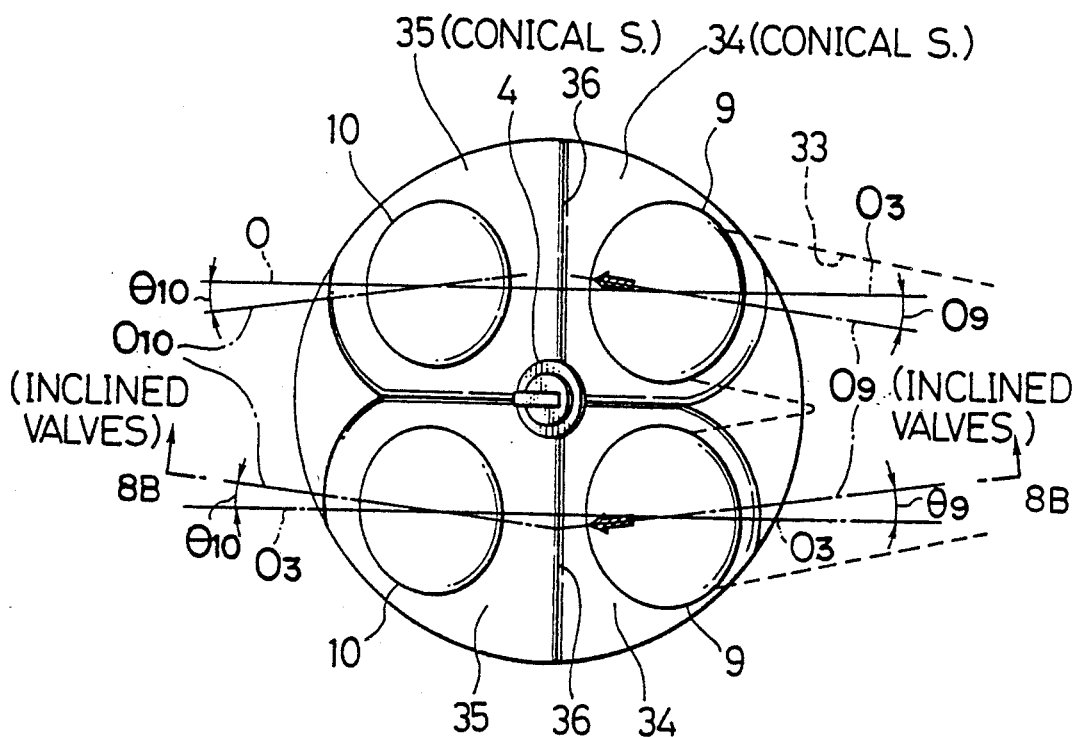
FIG. 8A is a plan view showing a combustion chamber wall on the cylinder head side, for assistance in explaining a fifth embodiment according to the present invention.
Figure 8B:
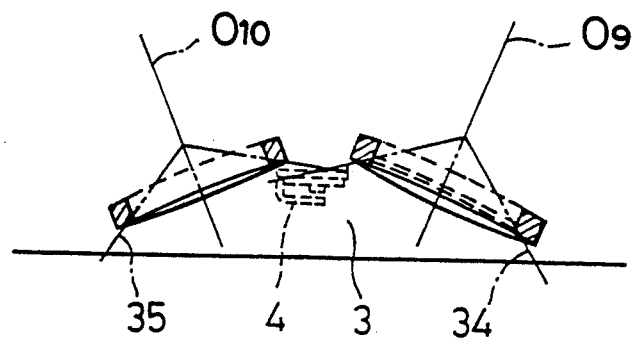
FIG. 8B is a cross-sectional view taken along the line 8B—8B in FIG. 8A.

FIGS. 8A and 8B show a fifth embodiment of the present invention. In this embodiment, an intake port 33 is divided into two Siamese type ports, and the two central stem lines $O_9$ of the two intake valves 9 are inclined by a predetermined angle $\theta_9$ radially outside away from the middle line $O_3$ of the combustion chamber 3, when seen along an axial direction of the cylinder, (the line $O_3$ can be obtained by connecting two central points of intake and exhaust valves 9 and 10), so that intake air is directed to the inside outer circumference of the combustion chamber 3. In addition, the two central stem lines $O_{10}$ of the two exhaust valves 10 are inclined by a predetermined angle $\theta_{10}$ radially outside away from the middle line $O_3$ of the combustion chamber 3, when seen along the axial direction of the cylinder, so that combustion gas is exhausted from the inside outer circumference of the combustion chamber 3. In this embodiment, although the two conical wall surfaces 34 and 35 are not offset from the central stem lines $O_9$ and $O_{10}$, since the two conical wall surfaces 34 and 35 are inclined as compared with the first embodiment shown in FIGS. 2A and 2B, it is possible to shift the boundary line 36 between the two conical wall surfaces 34 and 35 outward away from the ignition plug 4 to allow the intake air to flow mainly in the direction shown by thick arrows in FIG. 8A, so that it is possible to further effectively prevent the mixture from being concentrated at the ignition plug 4.

Figure 9:
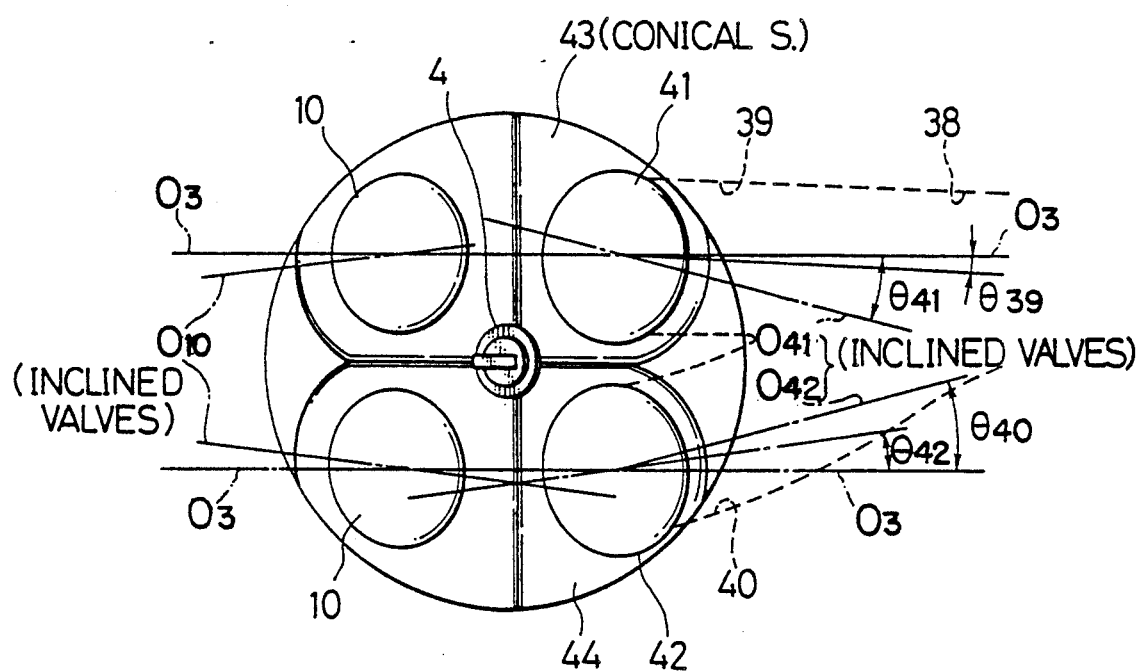
FIG. 9 is a plan view showing a combustion chamber wall on the cylinder head side, for assistance in explaining a sixth embodiment according to the present invention.

FIG. 9 shows a sixth embodiment, in which the Siamese type intake port 38 is divided into two asymmetrical ports. That is, a first intake port 39 is inclined at a small angle $\theta_{39}$ from the middle line $O_3$ of the combustion chamber 3 and a second intake port 40 is inclined at a large angle $\theta_{40}$ from the middle line $O_3$ of the combustion chamber 3. Therefore, the central stem line $O_{41}$ of the intake valve 41 is inclined at a large angle $\theta_{41}$ radially outside away from the middle line $O_3$ of the combustion chamber 3 and toward the inside outer circumference of the combustion chamber 3, and that $O_{42}$ of the intake valve 42 is inclined at a small angle $\theta_{42}$ radially outside away from the middle line $O_3$ of the combustion chamber 3 and toward the inside outer circumference of the combustion chamber 3. Further, the two conical wall surfaces 43 and 44 are inclined in the same direction by locating the two apices on the central stem lines $O_{41}$ and $O_{42}$, respectively. Since the intake air introduced into the combustion chamber 3 through the two intake ports 39 and 40 are allowed to flow symmetrically to the inside outer circumference of the combustion chamber 3, it is possible to effectively prevent the mixture from being concentrated at the ignition plug 4 or misfiring of the ignition plug 4. Further, in this embodiment, when the angle $\theta_{40}$ is large, the angle $\theta_{42}$ can be reduced to zero degrees.

Figure 10A:
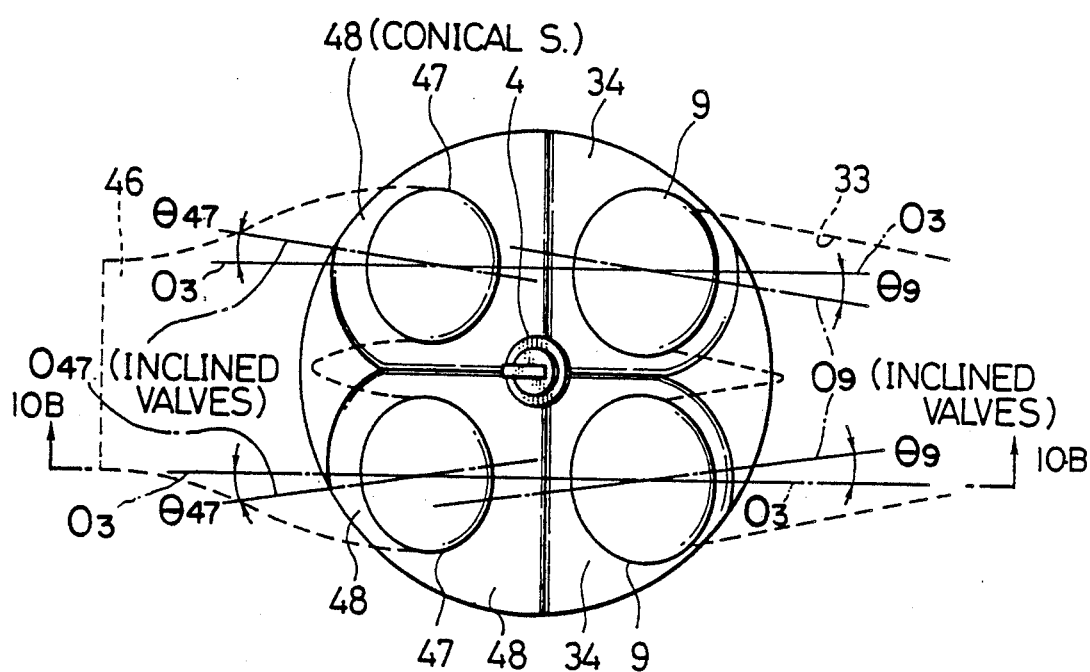
FIG. 10A is a plan view showing a combustion chamber wall on the cylinder head side, for assistance in explaining a seventh embodiment according to the present invention.
Figure 10B:
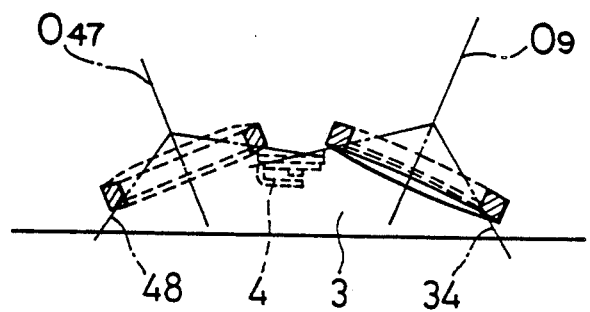
FIG. 10B is a cross-sectional view taken along the line 10B—10B in FIG. 1A.

FIGS. 10A and 10B show a seventh embodiment, in which a Siamese type intake port 33 and a Siamese type exhaust port 46 are provided. The central stem line $O_9$ of the two intake valve 9 is inclined by a predetermined angle $\theta_9$ radially outside away from the middle line $O_3$ of the combustion chamber 3 and toward the inside outer circumference of the combustion chamber, and the central stem line $O_{47}$ of the two exhaust valve 47 is also inclined by a predetermined angle $\theta_{47}$ radially inside away from the middle line $O_3$ of the combustion chamber 3 and toward the center of the combustion chamber 3 or the ignition plug 4. The intake side conical wall surfaces 34 are inclined in the same direction by locating the apices on the central stem lines $O_9$, and the conical wall surfaces 48 are inclined in the same direction by locating the apices on the central stem lines $O_{47}$.

In this embodiment, since the two intake ports and the two conical wall surfaces 34 are both inclined away from the ignition plug 4, the intake air flows mainly toward the inside outer circumference of the combustion chamber 3 away from the ignition plug 4, so that it is possible to reduce the amount of mixture stuck onto the ignition plug 4. Further, since the two exhaust ports and the two conical wall surfaces 48 are both inclined toward the center of the combustion chamber 3, whenever the exhaust valves 47 are actuated open, the combustion gas within the combustion chamber is exhausted beginning from around the ignition plug 4, so that it is possible to reduce the amount of the combustion gas near the ignition plug 4 or to increase the combustion efficiency at the succeeding cycle.

Further, in this embodiment, it is also possible to set the angle $\theta_9$ to zero degrees so that the central stem line $O_9$ of the intake valve 9 can be located on the middle line $O_3$ of the combustion chamber 3.

Figure 11:
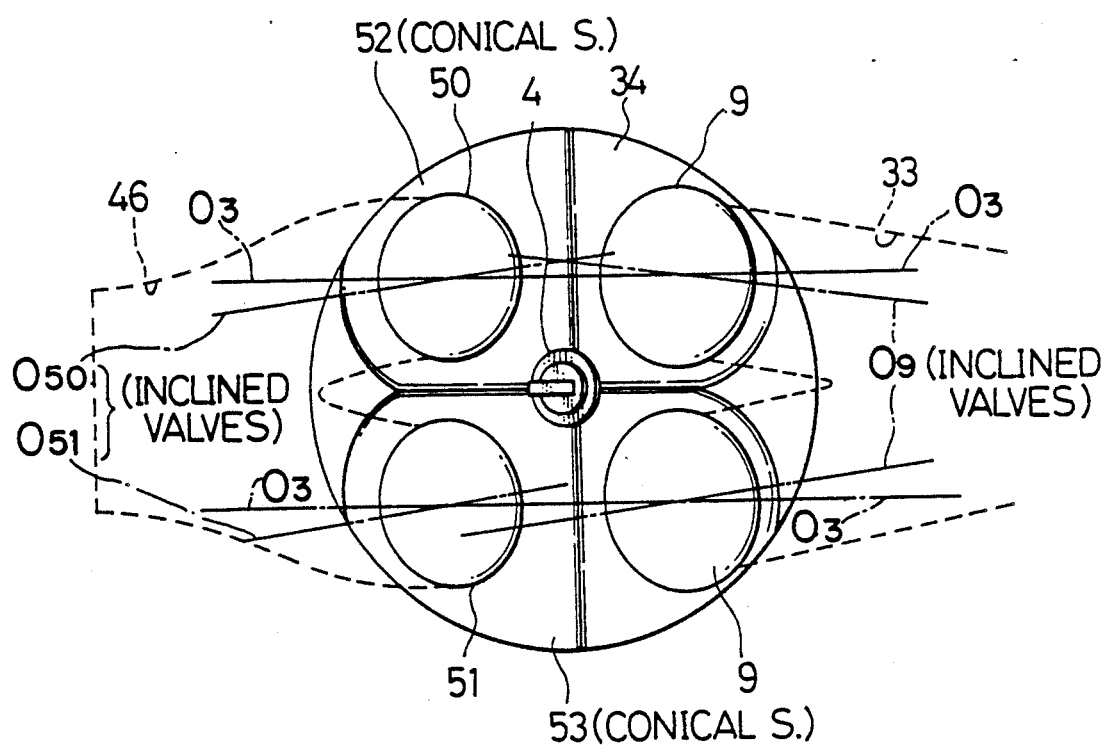
FIG. 11 is a plan view showing a combustion chamber wall on the cylinder head side, for assistance in explaining an eighth embodiment according to the present invention.

FIG. 11 shows an eighth embodiment, in which the Siamese type exhaust port 46 is arranged asymmetrically in such a way that the central stem line $O_{50}$ and the conical wall surface 52 of a first exhaust valve 50 are inclined radially outside away from the middle line $O_3$ of the combustion chamber 3 or toward the inside outer circumference of the combustion chamber 3 or away from the ignition valve 4, and the central stem line $O_{51}$ and the conical wall surface 53 of a second exhaust valve 51 are inclined radially inside away from the middle line $O_3$ of the combustion chamber 3 or toward the ignition valve 4. In this embodiment, since the exhaust valve 51 directed toward the ignition plug 4 can effectively scavenge the combustion gas from near the ignition plug 4, it is possible to reduce the residual gas around the ignition plug 4.

Figure 12A:
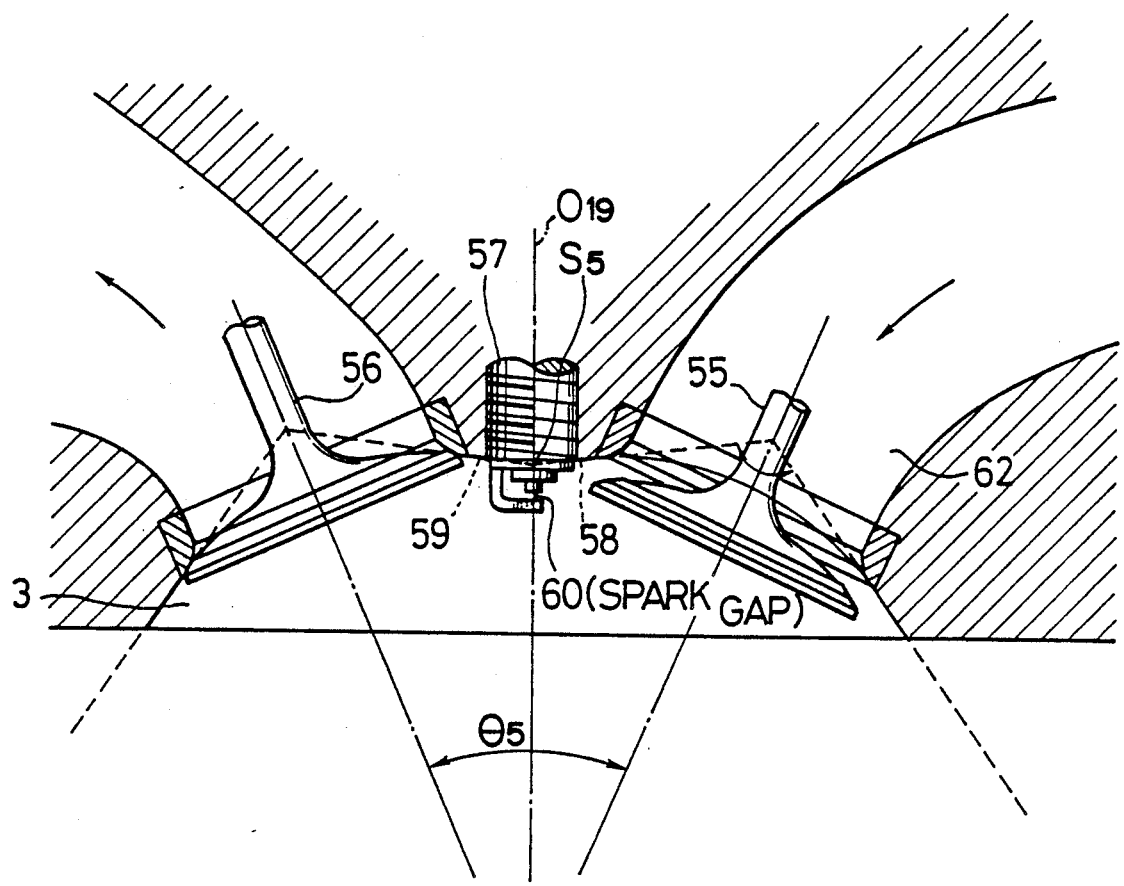
FIG. 12A is an enlarged cross-sectional view showing intake and exhaust valves, for assistance in explaining a ninth embodiment according to the present invention.
Figure 12B:
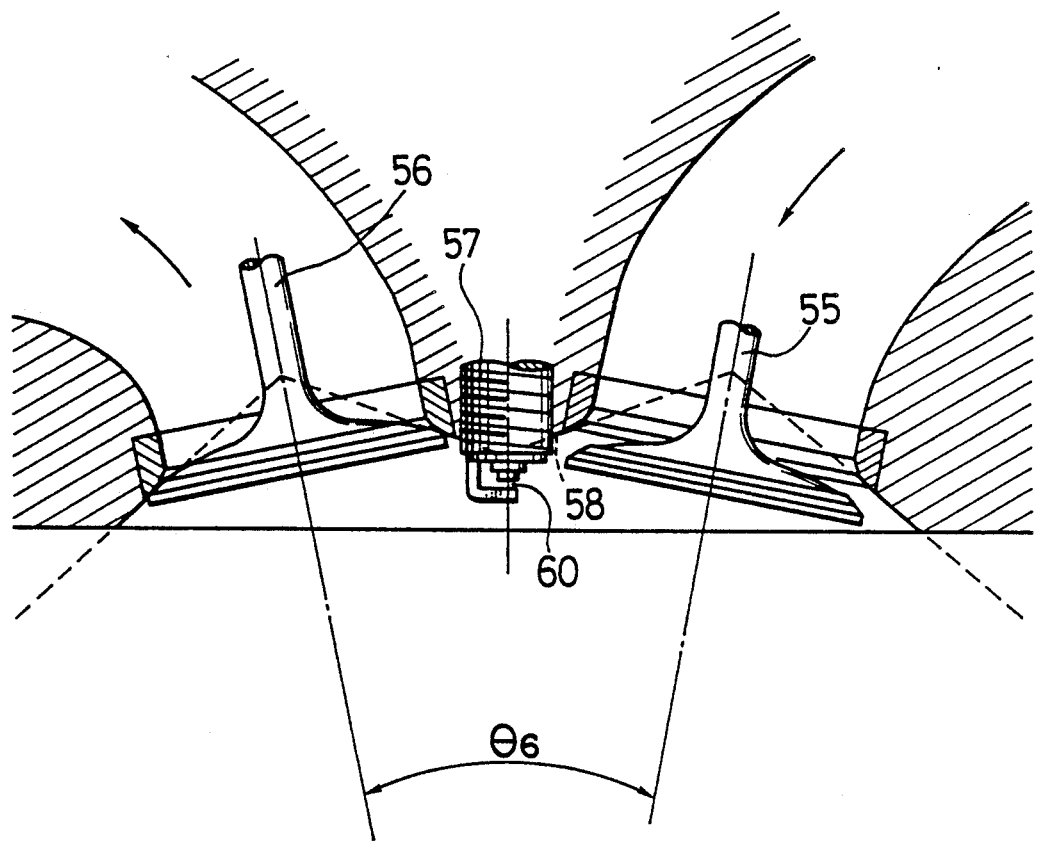
FIG. 12B is a similar enlarged cross-sectional view showing intake and exhaust valves, for assistance in explaining the same ninth embodiment according to the present invention.

FIGS. 12A and 12B show a ninth embodiment, in which a spark gap 60 of an ignition plug 57 is arranged so as to project by a predetermined distance, along the central line $O_{19}$ of the cylinder, from a point $S_5$ at which an extension line from the intake side conical wall surface 58 of an intake valve 55 intersects another extension line from the exhaust side conical wall surface 59 of an exhaust valve 56 arranged at a valve angle $\theta_5$. When the intake valve 55 is actuated open to idle or operate the engine, liquid fuel flows from the intake port 62 into the combustion chamber 3. In this case, although liquid fuel flows along the intake side conical wall surface 58 toward the ignition plug 57, since the spark gap 60 projects from an extension line of the conical wall surface 58, it is possible to prevent the liquid fuel from directly flowing to the spark gap 60; that is, to prevent misfiring of the ignition plug 57. In this connection, although it is also possible to arrange the spark gap 60 below the extension line of the intake side conical wall surface 58 (inside the wall of the cylinder head), since it is necessary to form a recess in the wall of the combustion chamber 3 to accommodate the spark gap 60, there exists another problem in that fuel is accumulated in the recess and therefore misfiring occurs.

Further, FIG. 12B shows the case where the intake valve 55 is arranged at a small valve angle $\theta_5$ with respect to the exhaust valve 56. Similarly, in this case, the spark gap 60 of the ignition plug 57 is arranged so as to project from an extension line from the conical wall surface 58 of the intake valve 55.

Figure 13:
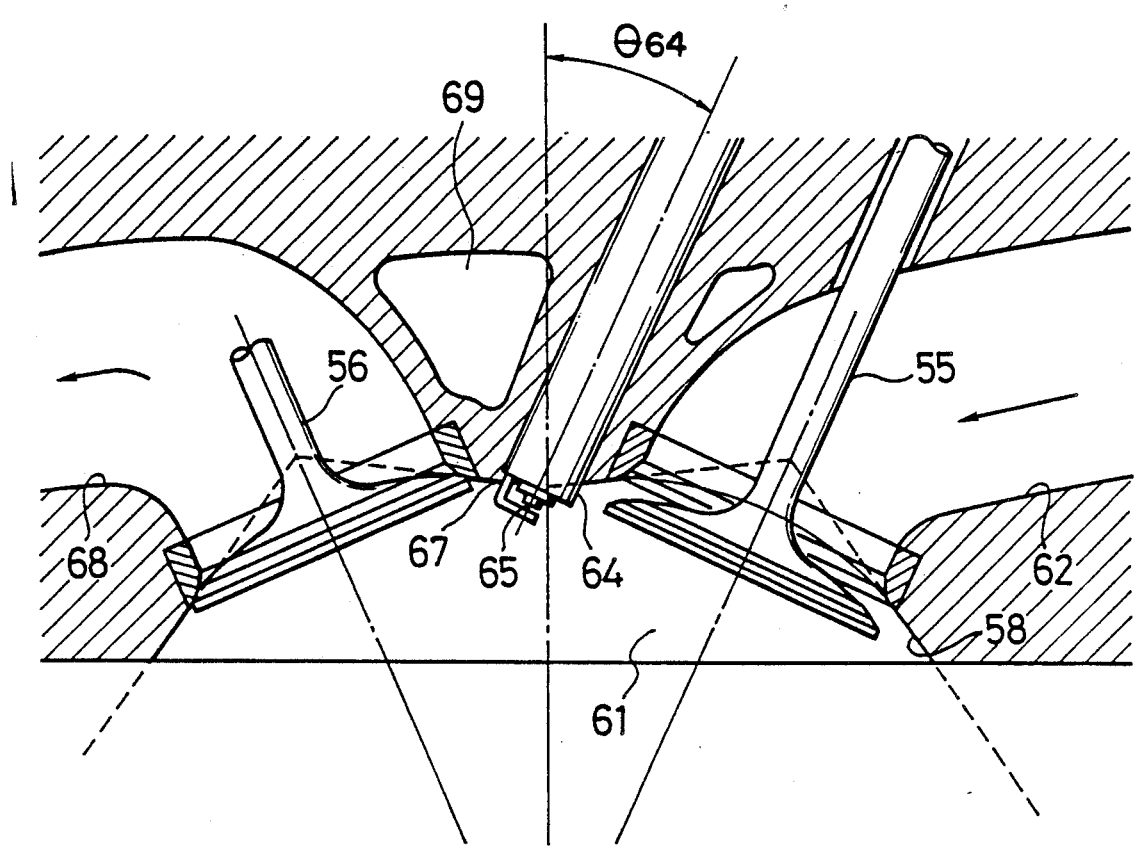
FIG. 13 is a similar enlarged cross-sectional view showing an ignition plug, for assistance in explaining a tenth embodiment according to the present invention.

FIG. 13 shows a tenth embodiment, in which a spark gap 65 of an ignition plug 64 is arranged so as to project from the combustion chamber wall 67 and further the ignition plug 64 is inclined toward the exhaust valve 56 by a predetermined angle $\theta_{64}$ so that the spark gap 65 is located near the exhaust valve 56. In this embodiment, when liquid fuel flows directly on and along the intake side conical wall surface 58 from an intake port 62, since the spark gap 65 is directed to the opposite direction, it is possible to prevent the liquid fuel from directly flowing to the spark gap 65, thus effectively preventing misfiring of the ignition plug 64.

Further, since the ignition plug 64 is arranged in the same inclination direction as the intake valve 55, there exists such an advantage that it is possible to increase the cross-sectional area of a water jacket 69 formed between the exhaust port 68 and the ignition plug 64, that is, to effectively cool the ignition plug 64 or the high temperature area near the plug 64.

Figure 14A:
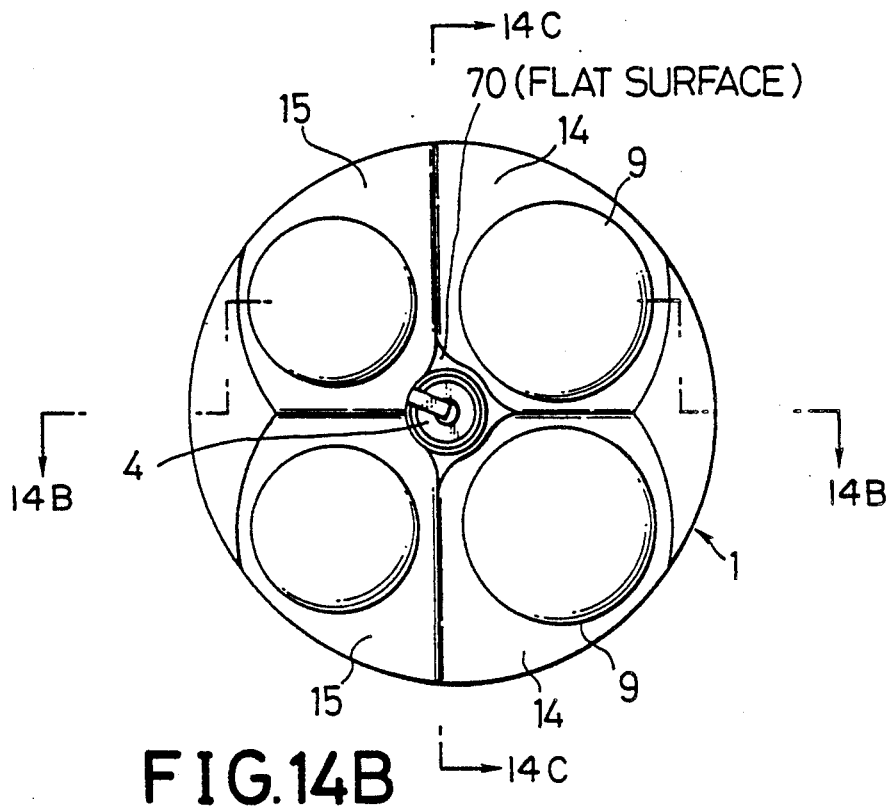
FIG. 14A is a plan view showing a combustion chamber wall on the cylinder head side, for assistance in explaining an eleventh embodiment according to the present invention.
Figure 14B:
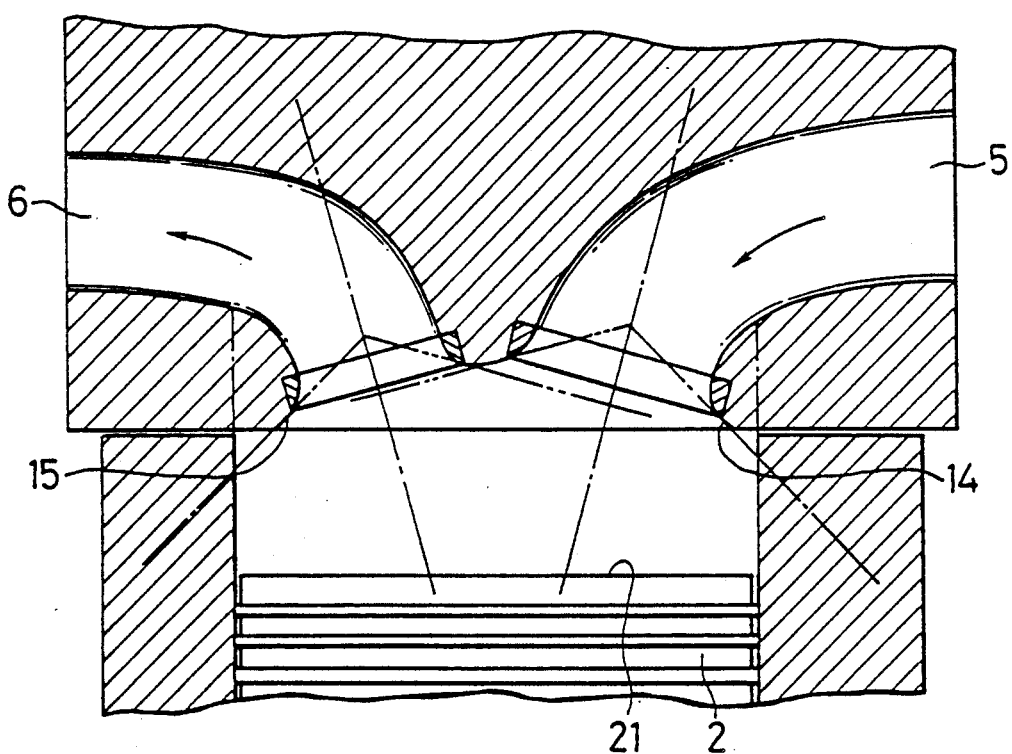
FIG. 14B is a cross-sectional view taken along the line 14B—14B in FIG. 14A.
Figure 14C:
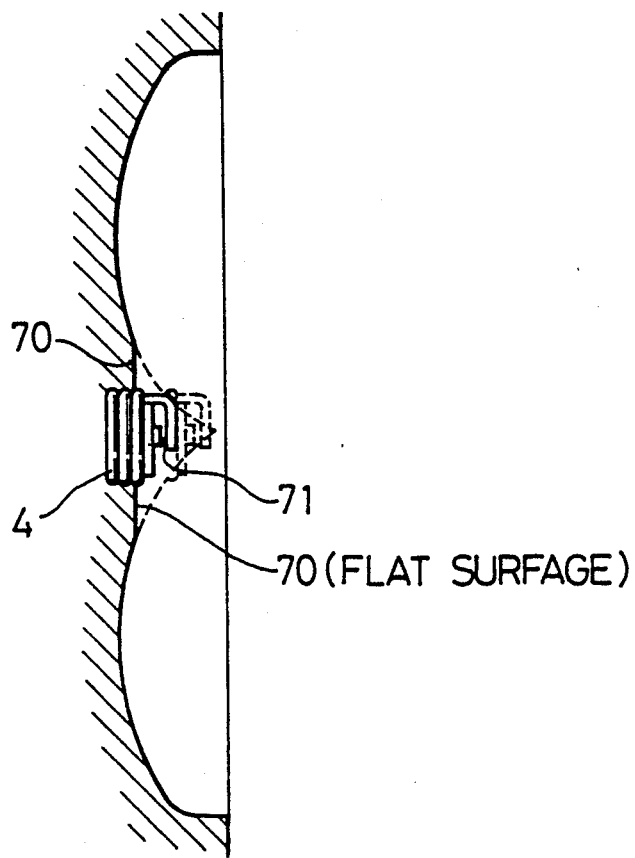
FIG. 14C is a cross-sectional view taken along the line 14C—14C in FIG. 14A.

FIGS. 14A, 14B and 14C show an eleventh embodiment, in which a flat surface 70 is formed between the ignition plug 4 and the intake side conical wall surface 14 roughly in parallel to the top surface 21 of the piston 2. In this embodiment, since the liquid fuel introduced through the intake valve 9 flows on and along the intake side conical wall surface 14 and the flat surface 70 to the exhaust side conical surface 15, it is possible to prevent the liquid fuel from directly flowing through the spark gap 71 of the ignition plug 4, so that misfiring of the ignition plug 4 can be prevented effectively.

Figure 15A:
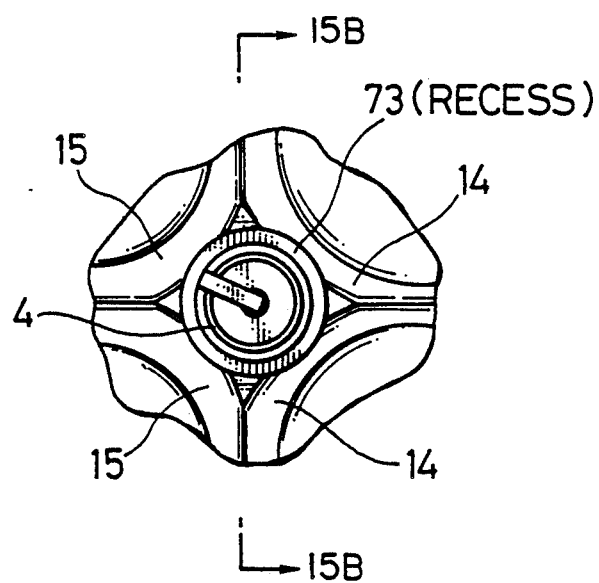
FIG. 15A is a partial plan view showing a combustion chamber wall on the cylinder head side, for assistance in explaining a first modification of the eleventh embodiment.
Figure 15B:
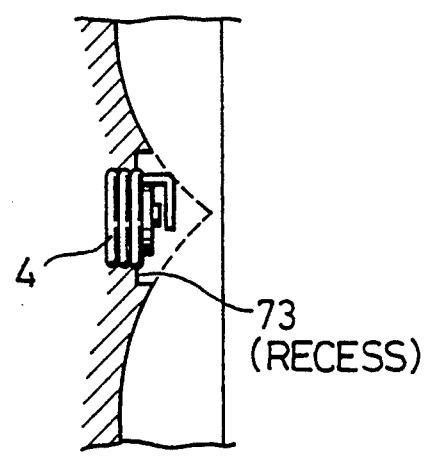
FIG. 15B is a partial cross-sectional view taken along the line 15B—15B in FIG. 15A.

FIGS. 15A and 15B show a first modification of the eleventh embodiment, in which an annular recess 73 is formed around the ignition plug 4. In this embodiment, since the liquid fuel flowing on and along the intake side conical wall surface 14 reaches the exhaust side conical wall surface 15 through the annular recess 73, it is also possible to prevent misfiring of the ignition plug.

Figure 16A:
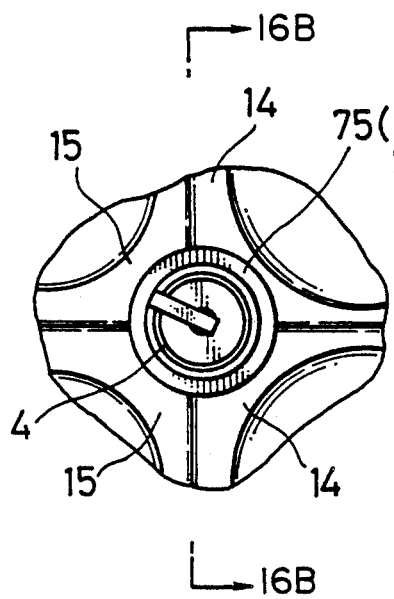
FIG. 16A is a partial plan view showing a combustion chamber wall on the cylinder head side, for assistance in explaining a second modification of the eleventh embodiment.
Figure 16B:
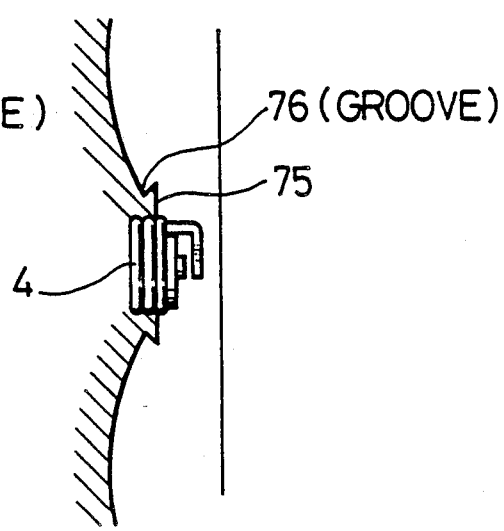
FIG. 16B is a partial cross-sectional view taken along the line 16B—16B in FIG. 16A.

FIGS. 16A and 16B show a second modification of the eleventh embodiment, in which a flat surface 75 is formed around the ignition plug 4 in parallel to the top surface of the piston, and additionally a circular groove 76 is formed in the inner wall of the cylinder head and around and below the flat surface 75. In this embodiment, since the liquid fuel flowing on and along the intake side conical wall surface 14 is trapped by this circular groove 76 and then guided to the exhaust side conical wall surface 15, it is also possible to prevent misfiring of the ignition plug 4.

Figure 17:
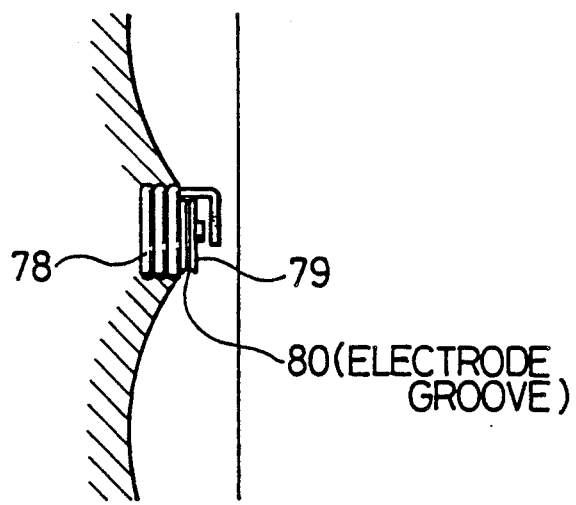
FIG. 17 is a partial plan view showing a combustion chamber wall on the cylinder head side, for assistance in explaining a third modification of the eleventh embodiment.

FIG. 17 shows a third modification thereof, in which a circular groove 80 is formed on the outer circumferential surface of a cylindrical electrode 79 of the ignition plug 78 to guide the liquid fuel from the intake side conical wall surface to the exhaust side conical wall surface.

Figure 18A:
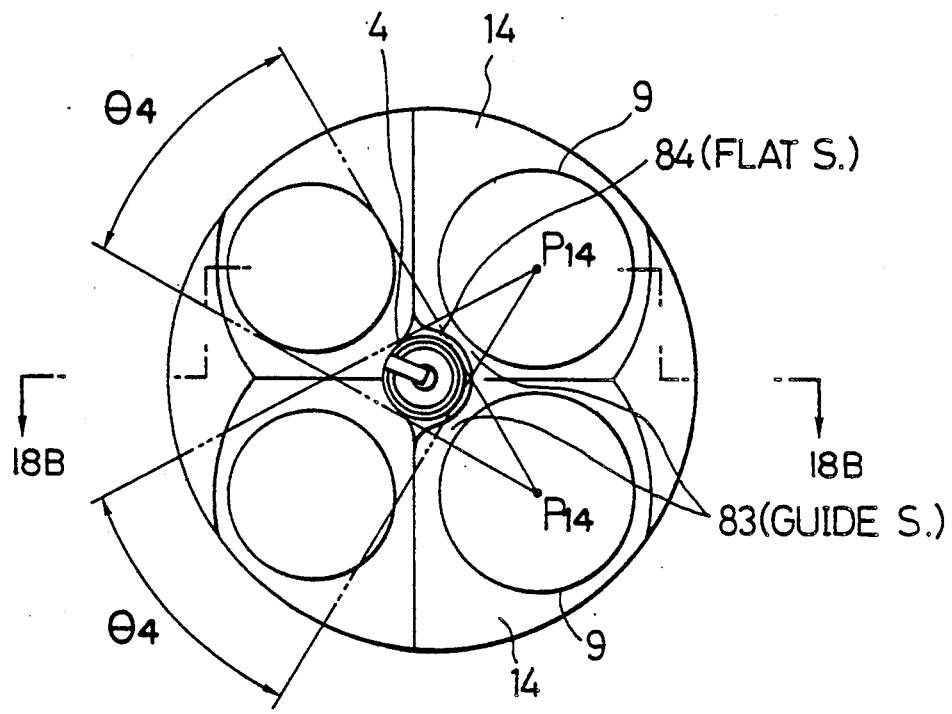
FIG. 18A is a plan view showing a combustion chamber wall on the cylinder head side, for assistance in explaining a twelfth embodiment according to the present invention.
Figure 18B:
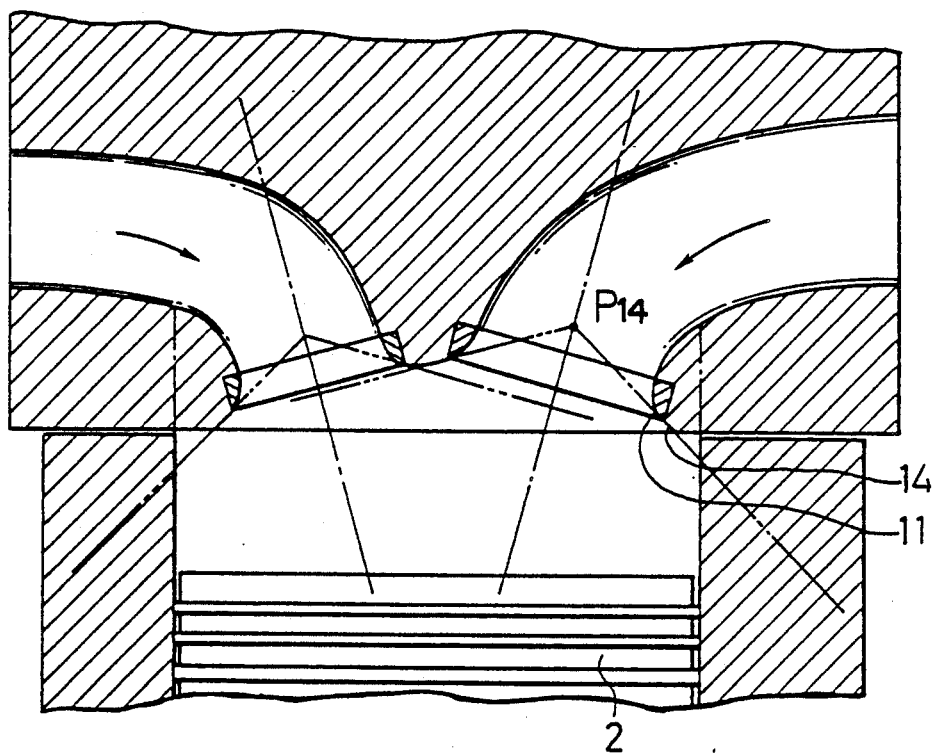
FIG. 18B is a cross-sectional view taken along the line 18B—18B in FIG. 18A.
Figure 18C:
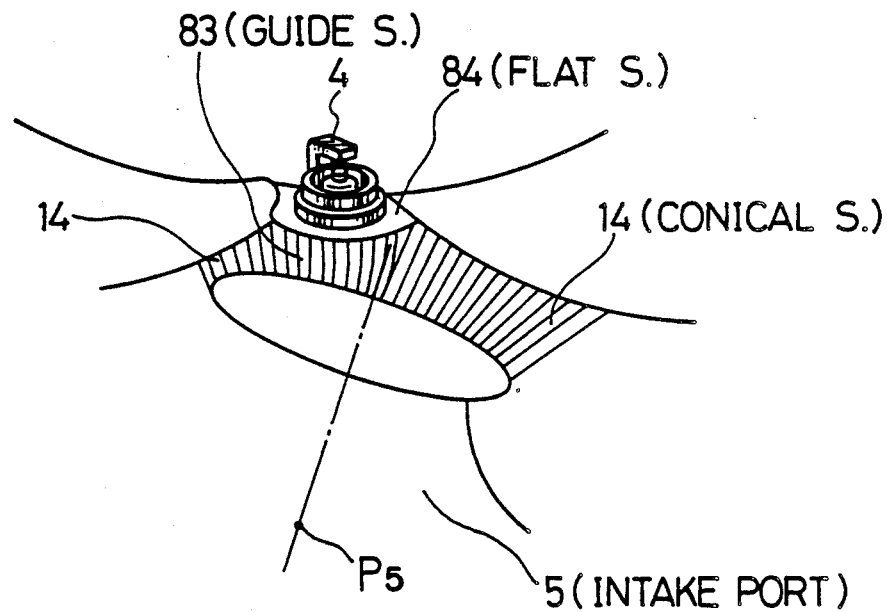
FIG. 18C is a partial perspective view showing a combustion chamber wall on the cylinder head side, for assistance in explaining the twelfth embodiment.

FIGS. 18A, 18B and 18C show a twelfth embodiment, in which two intake side conical wall surfaces 14 are formed in continuous connection with the end surfaces 11 of the intake valve seats, respectively; a flat surface 84 is formed around the ignition plug 4; and additionally, two guide surfaces 83 with a radius of curvature smaller than that of the conical wall surface 14 are formed at two sectorial areas defined by two apices $P_{14}$ of the intake side conical wall surfaces 14 and a sector angle $\theta_4$ including the ignition plug 4 at its center, respectively. In this embodiment, since the liquid fuel flows from the conical wall surface 14 through the guide surfaces 83 to the exhaust ports without directly flowing to the ignition plug 4, it is possible to effectively prevent misfiring of the ignition plug 4.

Figure 19:
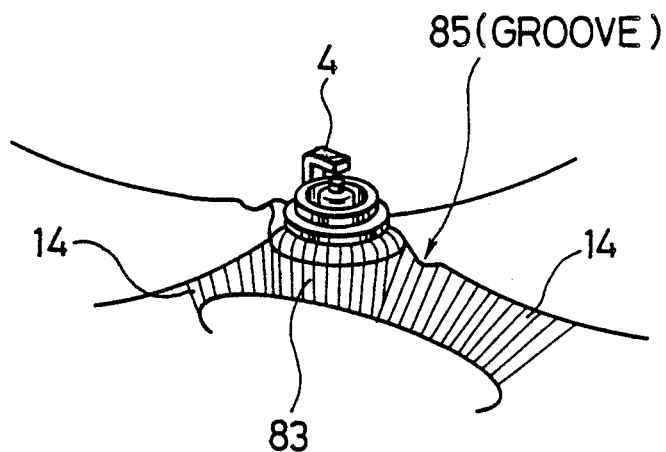
FIG. 19 is a similar perspective view showing a combustion chamber wall on the cylinder head side, for assistance in explaining a first modification of the twelfth embodiment.

FIG. 19 shows a first modification of the twelfth embodiment, in which a semicircular groove 85 is formed on the intake side conical surfaces 14 and the guide surface 83 so as to enclose the ignition plug 4.

Figure 20A:
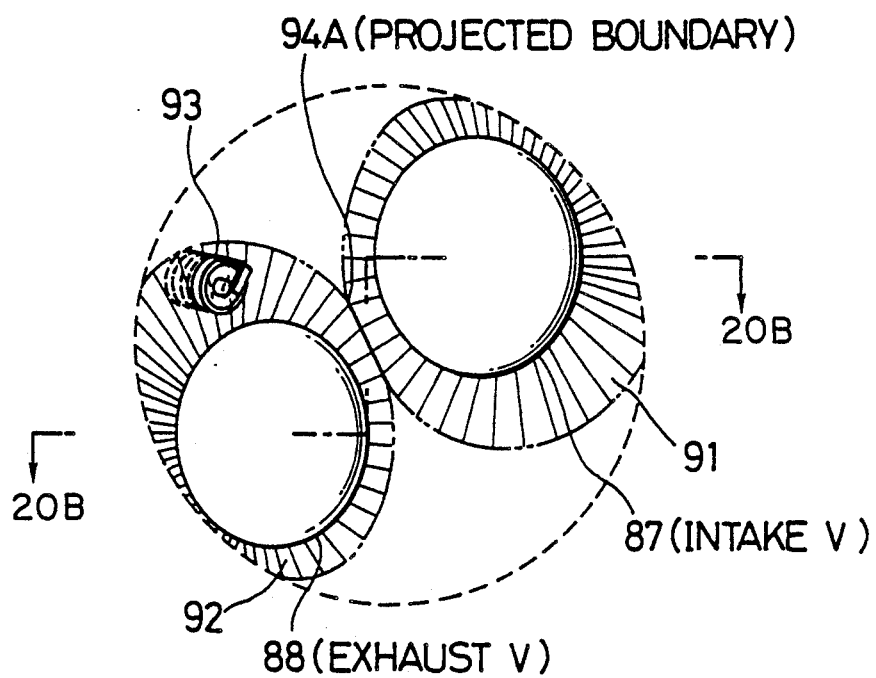
FIG. 20A is a plan view showing a combustion chamber wall on the cylinder head side, for assistance in explaining a thirteenth embodiment according to the present invention.
Figure 20B:
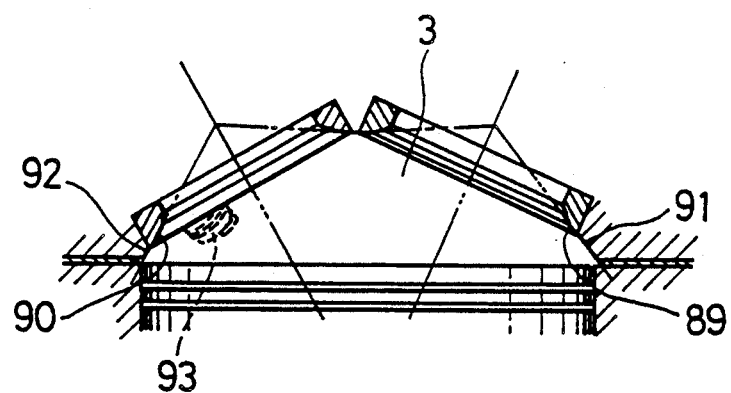
FIG. 20B is a cross-sectional view taken along the line 20B—20B in FIG. 20A.

FIGS. 20A and 20B show a thirteenth embodiment, which is applied to an engine provided with a single intake valve 87 and a single exhaust valve 88 for each cylinder. In this embodiment, an intake side conical wall surface 91 is formed in continuous connection with an end surface 89 of the intake valve seat; an exhaust side conical wall surface 92 is formed in continuous connection with an end surface 90 of the exhaust valve seat; and an ignition plug 93 is provided so as to be directed from the exhaust side conical wall surface 92 to the center of the combustion chamber 3. In this embodiment, since a straight boundary line 94A formed between the intake side conical wall surface 91 and the exhaust side conical wall surface 92 projects in front of the ignition plug 93, it is possible to prevent the liquid fuel introduced through the intake valve from directly flowing to the ignition plug 93.

Figure 21:
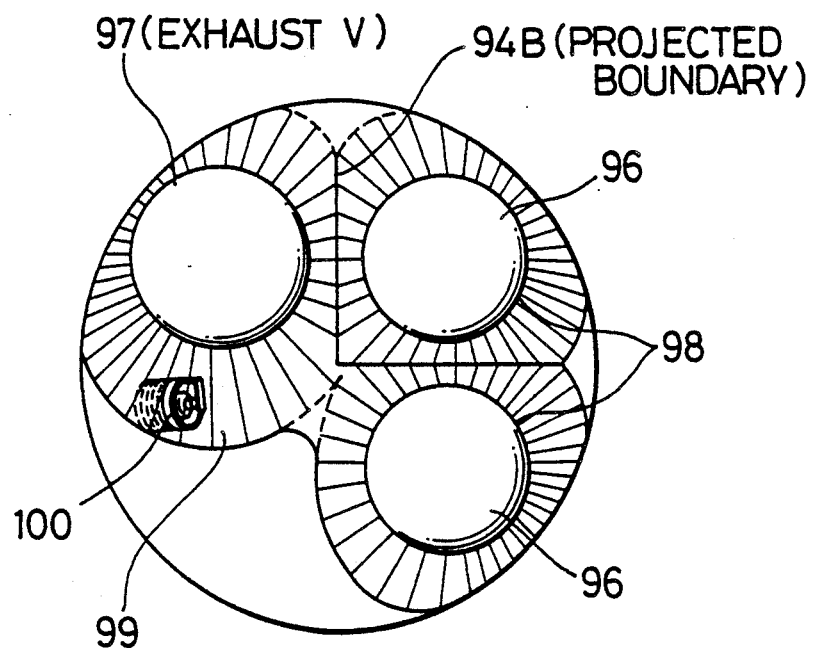
FIG. 21 is a plan view showing a combustion chamber wall on the cylinder head side, for assistance in explaining a fourteenth embodiment according to the present invention.

FIG. 21 shows a fourteenth embodiment, which is applied to an engine provided with two intake ports 96 and a single exhaust port 97 for each cylinder. In this embodiment, two intake side conical wall surfaces 98 and an exhaust side conical wall surface 99 are formed, and an ignition plug 100 is provided so as to be directed from the exhaust side conical wall surface 99 to the center of the combustion chamber 3. In this embodiment, since an angled boundary line 94B formed between the exhaust side conical wall surface 99 and the two intake side conical wall surfaces 98 projects in front of the ignition plug 100, it is possible to prevent the liquid fuel from directly flowing to the ignition plug 100.

Figure 22A:
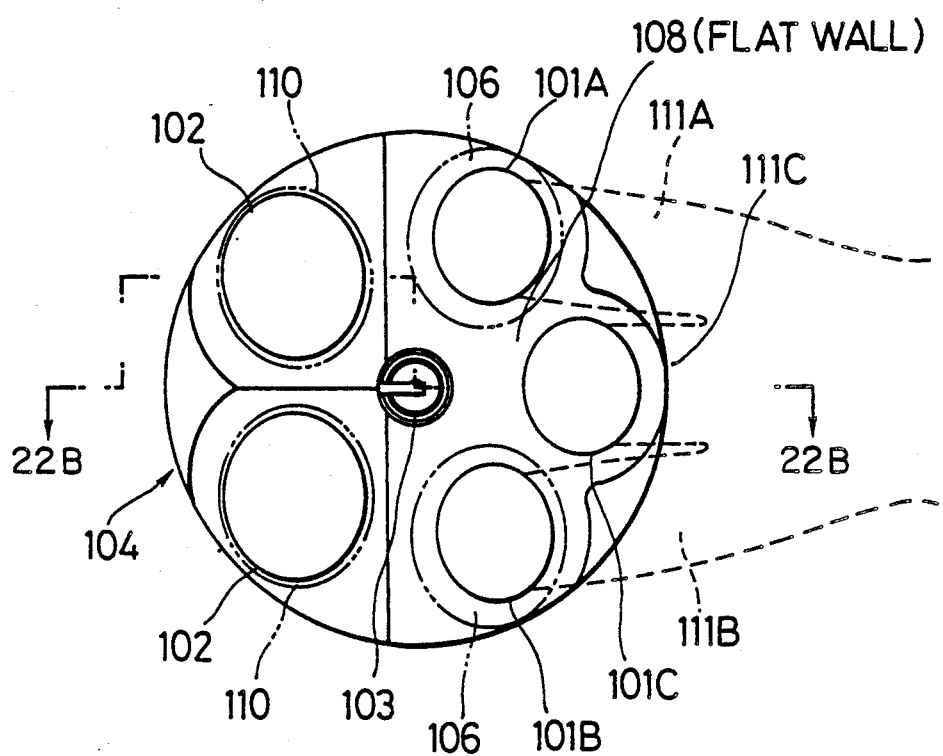
FIG. 22A is a plan view showing a combustion chamber wall on the cylinder head side, for assistance in explaining a fifteenth embodiment according to the present invention.
Figure 22B:
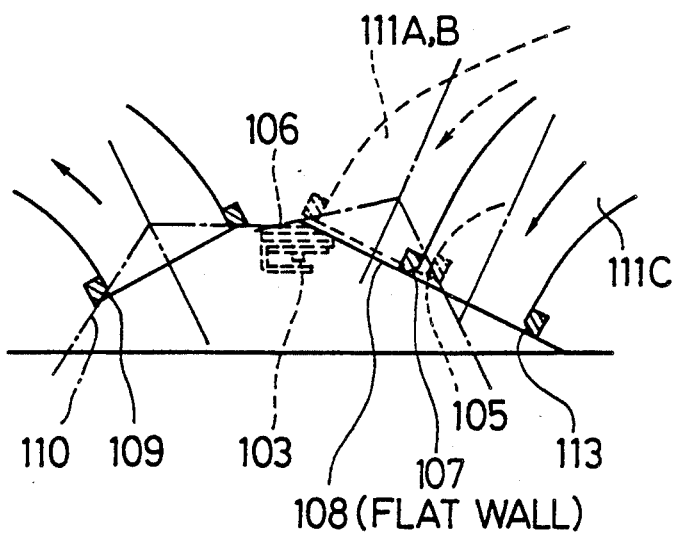
FIG. 22B is a cross-sectional view taken along the line 22B—22B in FIG. 22A.

FIGS. 22A and 22B show a fifteenth embodiment, which is applied to an engine provided with three intake ports 101 and two exhaust ports 102. In this embodiment, a single ignition plug 103 is disposed at the center of the engine; two intake side conical wall surfaces 106 are formed in continuous connection with end surfaces 105 of the two valve seats 101A and 101B of the combustion chamber wall 104; and further a flat wall 108 is formed around the middle intake valve seat 101C. Further, two exhaust side conical wall surfaces 110 are formed in continuous connection with the end surfaces 109 of the two exhaust valve seats 102.

In this embodiment, intake air introduced through the two side intake ports 111A and 111B can flow smoothly along the conical wall surfaces 106. Further, since the flat wall 108 is formed at an angle with respect to the end surface 113 of the valve seat 107 of the middle intake port 111C, it is possible to prevent the liquid fuel introduced through the middle intake port 111C from flowing toward the ignition plug 103, so that misfiring is effectively prevented.

Figure 23A:
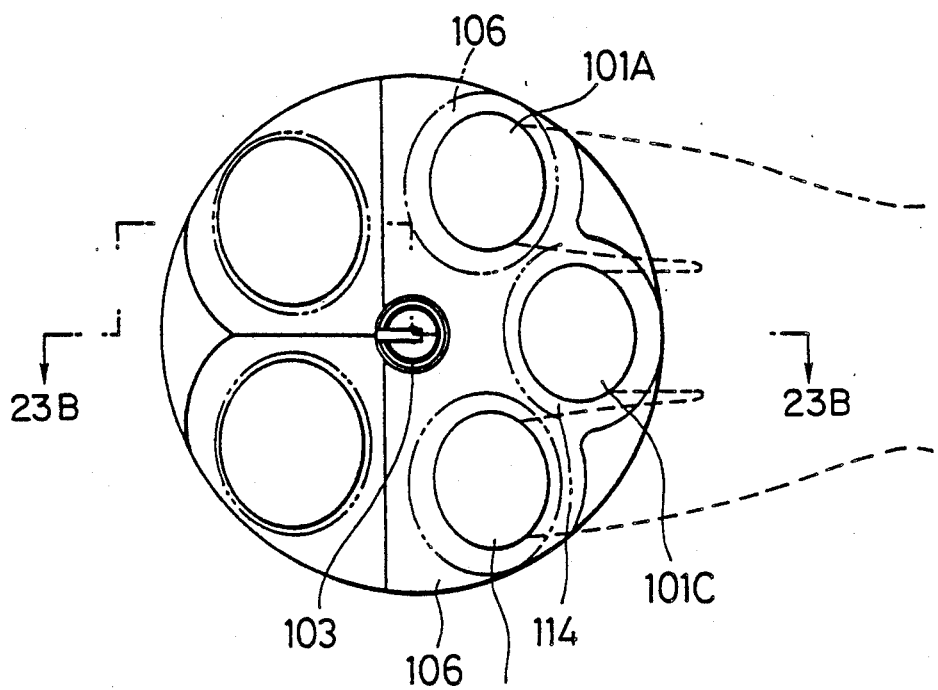
FIG. 23A is a plan view showing a combustion chamber wall on the cylinder head side, for assistance in explaining a sixteenth embodiment according to the present invention.
Figure 23B:
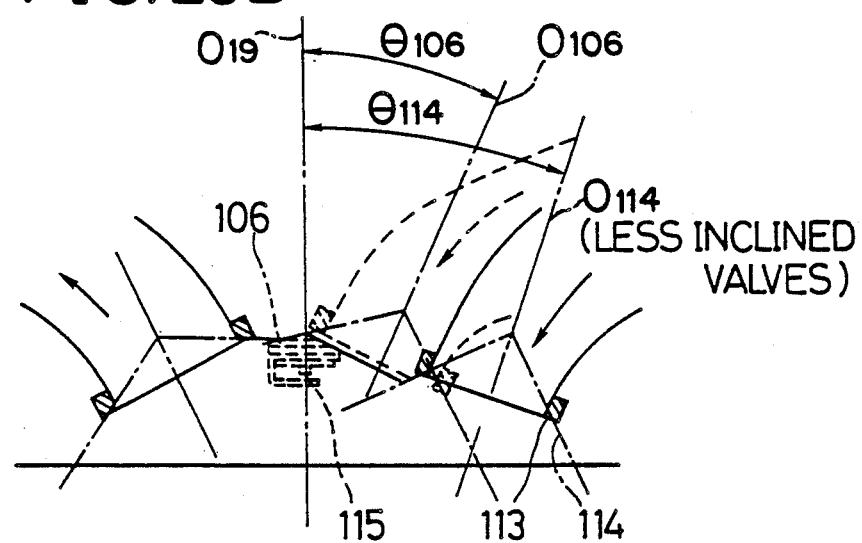
FIG. 23B is a cross-sectional view taken along the line 23B—23B in FIG. 23A.

FIGS. 23A and 23B show a sixteenth embodiment, in which another intake side conical wall surface 114 is additionally formed in continuous connection with an end surface 113 of the middle valve seat 101C of the combustion chamber wall and the central stem line $O_{114}$ of this conical wall surface 114 (i.e. the middle intake valve seat 101C) is inclined from the central line $O_{19}$ of the cylinder at an inclination angle $\theta_{114}$ smaller than an inclination angle $\theta_{106}$ between the central line $O_{19}$ and the central lines $O_{106}$ of the two conical wall surfaces 106 (i.e. the two side intake valve seats 101A and 101B).

In this embodiment, since the spark gap 115 of the ignition plug 103 is located away from an extension line of the middle conical wall surface 114, it is possible to prevent the liquid fuel from directly flowing to the spark gap 115.

Figure 24:
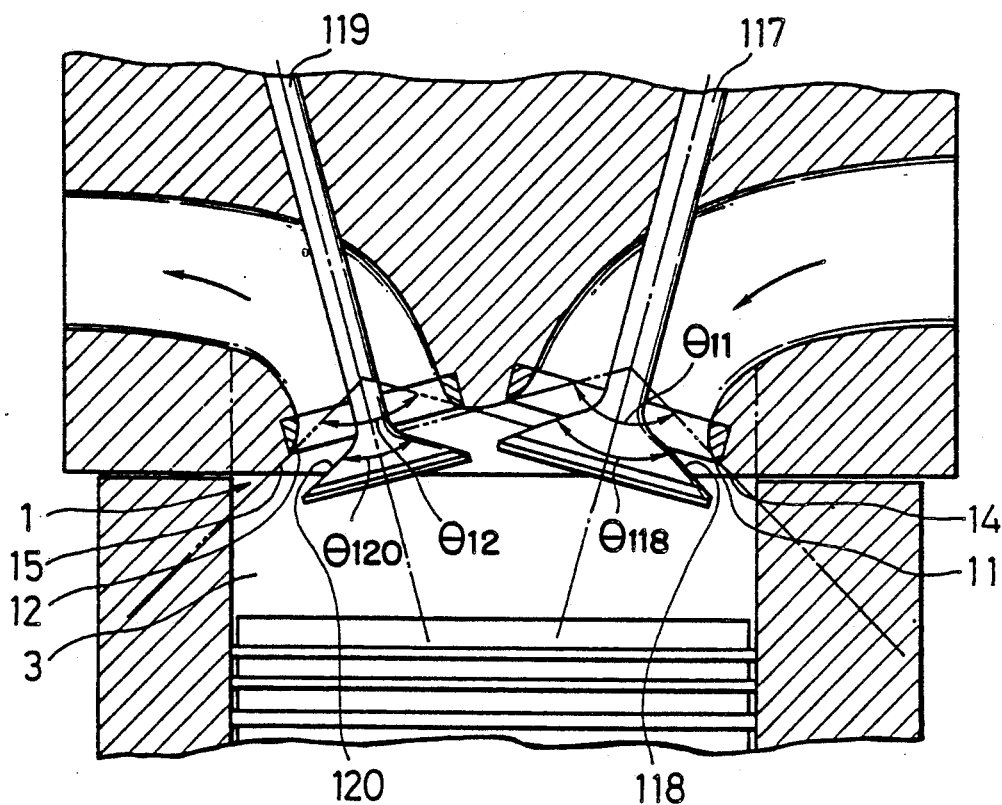
FIG. 24 is an enlarged cross-sectional view showing intake and exhaust valves, for assistance in explaining a seventeenth embodiment according to the present invention.

FIG. 24 shows a seventeenth embodiment, in which an angle $\theta_{118}$ of a conical portion 118 of the poppet intake valve 117 is formed roughly equal to an angle $\theta_{11}$ of the end surface 11 of the valve seat or the intake side conical wall surface 14, and further an angle $\theta_{120}$ of a conical portion 120 of the poppet exhaust valve 119 is formed roughly equal to an angle $\theta_{12}$ of the end surface 12 of the valve seat or the exhaust side conical wall surface 15.

In this embodiment, since intake air is introduced through a conical space formed between the conical portion 118 of the poppet intake valve 117 and the conical valve seat end surface 11 or the conical wall surface 14, and further combustion gas is exhausted through a conical space formed between the conical portion 120 of the poppet exhaust valve 119 and the conical valve seat end surface 12 or the conical wall surface 15, it is possible to more smoothly pass the intake air and the exhaust air through the conical spaces formed around the intake and exhaust valves 117 and 119, respectively, so that the air charging efficiency can be improved.

Figure 25A:
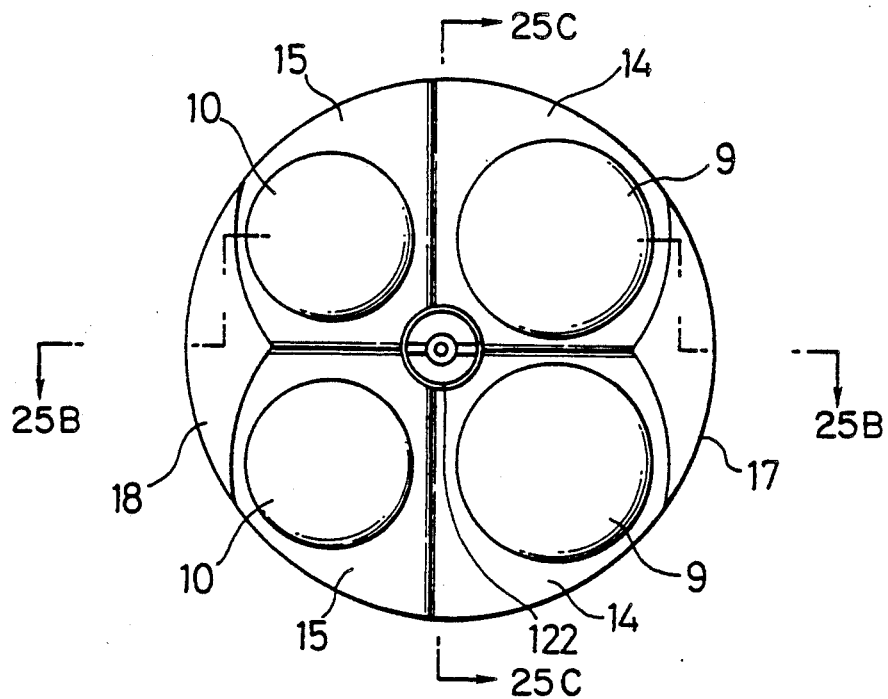
FIG. 25A is a plan view showing a combustion chamber wall on the cylinder head side, for assistance in explaining an eighteenth embodiment according to the present invention.
Figure 25B:
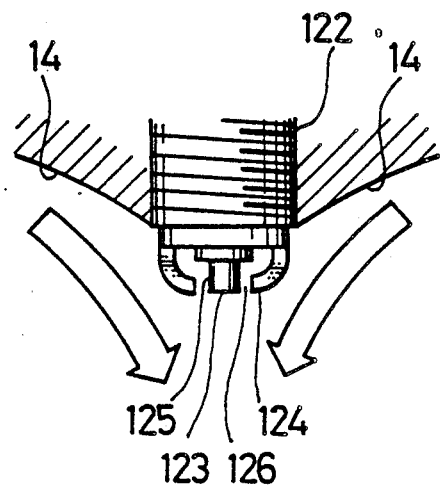
FIG. 25B is an enlarged cross-sectional view taken along the line 25B—25B in FIG. 25A.
Figure 25C:
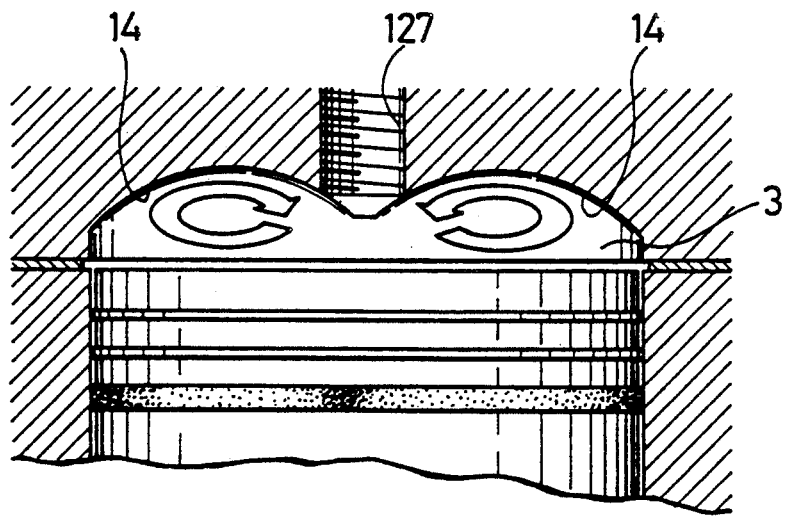
FIG. 25C is an enlarged cross-sectional view taken along the line 25C—25C in FIG. 25A.

FIGS. 25A, 25B and 25C show an eighteenth embodiment, in which two conical wall surfaces 14 are formed in continuous connection with the two valve seats of the two intake valves 9 and two conical wall surfaces 15 are formed in continuous connection with the two valve seats of the two exhaust valves 10; an ignition valve 122 is provided with a central cylindrical electrode 123 and two opposing angled side electrodes 124 so as to provide two opposing spark gaps 126 between an outer periphery 125 of the central electrode 123 and the side electrodes 124. Further, the ignition plug 122 is fitted to a plug hole 127 formed at the center of the wall of the cylinder head.

In this embodiment, since the two spark gaps 126 are open toward the center of the combustion chamber 3, when the piston comes up near the upper dead point at compression stroke, ignited mixture swirls along the conical wall surfaces 14 as shown thick arrows around the ignition plug 122. Therefore, the initial ignited flame circulates at the central ignition position, and therefore it is possible to increase the combustion speed and thus to improve the thermal efficiency.

As described above, in the internal combustion engine according to the present invention, since conical wall surfaces are formed in the wall of the combustion chamber of the cylinder head so as to be in continuous connection with the end surfaces of the valve seats, whenever the intake or exhaust valves are actuated open, intake air or combustion gas can be introduced or exhausted smoothly along the conical wall surfaces without producing vortices. Therefore, it is possible to improve the charging efficiency, increase the engine output, decrease the residual combustion gas, and thus improve the fuel consumption rate when the engine is being idled or operated under load.

What is claimed is:

1. A combination chamber for an internal combustion engine having a cylinder, a cylinder head, a piston, at least one intake valve seat for supporting an intake valve at an intake port, at least one exhaust valve seat for supporting an exhaust valve at an exhaust port, and an ignition plug, wherein an intake side conical wall surface is formed in an inner wall of the cylinder head in continuous connection with a conical surface formed at an end of the intake valve seat to smoothly introduce intake air into the cylinder through the intake valve, and wherein an apex of the intake side conical wall surface matches an apex of the conical surface formed at the end surface of the intake valve seat.

2. The combination chamber for an internal combustion engine of claim 1, wherein an exhaust side conical wall surface is further formed in the inner wall of the cylinder head in continuous connection with a conical surface formed at an end surface of the exhaust valve seat to smoothly exhaust combustion gas from the cylinder through the exhaust valve, and wherein an apex of the exhaust side conical wall surface matches an apex of the conical surface formed at the end surface of the exhaust valve seat.

3. The combustion chamber for an internal combustion engine of claim 1, wherein a top surface of the piston is formed with a circular recess at the center thereof to effectively swirl ignited mixture.

4. The combustion chamber for an internal combustion engine of claim 3, wherein the circular recess is divided into two semicircular recesses by a middle straight projection.

5. The combustion chamber for an internal combustion engine of claim 3, wherein the circular recess is an annular recess with a small diameter circular projection at the center thereof.

6. The combustion chamber for an internal combustion engine of claim 1, wherein an apex of the intake side conical wall surface is offset inside away from a central line of a stem of the intake valve when seen along an axial direction of the cylinder but radially outside away from the central line when seen along a radial direction of the cylinder to allow intake air to flow along a direction away from the ignition plug provided at the center of the cylinder head for prevention of misfiring.

7. The combustion chamber for an internal combustion engine of claim 2, wherein an apex of the exhaust side conical wall surface is offset inside away from a central line of a stem of the exhaust valve when seen along an axial direction of the cylinder but radially outside away from the central line when seen along a radial direction of the cylinder to allow combustion gas to flow along a direction away from the ignition plug provided at the center of the cylinder head for prevention of misfiring.

8. The combustion chamber for an internal combustion engine of claim 1, wherein a central line of a stem of the intake valve is inclined radially outside away from a middle line of the combustion chamber when seen along an axial direction of the cylinder for prevention of misfiring.

9. The combustion chamber for an internal combustion engine of claim 2, wherein a central line of a stem of the exhaust valve is inclined radially outside away from a middle line of the combustion chamber when seen along an axial direction of the cylinder for prevention of misfiring.

10. The combustion chamber for an internal combustion engine of claim 2, wherein a central line of a stem of the exhaust valve is located radially inside away from a middle line of the combustion chamber when seen along an axial direction of the cylinder for prevention of misfiring.

11. The combustion chamber for an internal combustion engine of claim 2, wherein a spark gap of the ignition plug projects from an inner wall surface of the cylinder head at a boundary between the intake side conical wall surface and the exhaust side conical wall surface for prevention of misfiring.

12. The combustion chamber for an internal combustion engine of claim 11, wherein the ignition plug is inclined toward the exhaust valve for prevention of misfiring.

13. The combustion chamber for an internal combustion engine of claim 2, wherein a flat surface is formed in the inner wall of the cylinder head and around the ignition plug in parallel to a top surface of the piston to allow liquid fuel to directly flow to the exhaust side conical wall surface along the formed flat surface for prevention of misfiring.

14. The combustion chamber for an internal combustion engine of claim 13, wherein the flat surface is a recess formed in the inner wall of the cylinder head and around the ignition plug.

15. The combustion chamber for an internal combustion engine of claim 13, wherein a circular groove is further formed in the inner wall of the cylinder head and around and below the flat surface.

16. The combustion chamber for an internal combustion engine of claim 13, wherein a circular groove is further formed in an outer periphery of a cylindrical electrode of the ignition plug.

17. The combustion chamber for an internal combustion engine of claim 13, wherein a guide surface whose radius of curvature is smaller than that of the intake side conical wall surface is additionally formed between the flat surface and the intake side conical wall surface at a sectorial area defined by an apex of the intake side conical wall surface and a sector angle including the ignition plug at its center to allow liquid fuel to directly flow to the exhaust valve along the guide surface for prevention of misfiring.

18. The combustion chamber for an internal combustion engine of claim 17, wherein an arcuate groove is further formed on the guide surface and around the ignition plug.

19. The combustion chamber for an internal combustion engine of claim 2, wherein a boundary between the at least one intake side conical wall surface and the exhaust side conical wall surface is formed near a center of the cylinder, and an ignition plug is disposed at a position away from a center of the cylinder so as to be directed toward the center of the cylinder so that liquid fuel introduced through the intake port is obstructed by the boundary from flowing directly to the ignition plug.

20. The combustion chamber for an internal combustion engine of claim 2, wherein where three intake valves and two exhaust valves are provided, two intake side conical wall surfaces are formed in an inner wall of the cylinder head in continuous connection with a conical surface formed at an end of each of the two outside intake valve seats, and an intake side flat wall surface is formed in an inner wall of the cylinder head from an end of the middle intake valve seat to prevent liquid fuel introduced through the middle intake valve from directly flowing toward the ignition plug disposed at a center of the cylinder head.

21. The combustion chamber for an internal combustion engine of claim 2, wherein where three intake valves and two exhaust valves are provided, an angle between a central line of the cylinder and a central line of a stem of a middle intake valve is determined smaller than that between the central line and a central line of a stem of each of two side intake valves, and three intake side conical wall surfaces are formed in an inner wall of the cylinder head in continuous connection with a conical surface formed at an end of each of the three intake valve seats to prevent liquid fuel introduced through the middle intake valve from directly flowing toward the ignition plug disposed at a center of the cylinder head.

22. The combustion chamber for an internal combustion engine of claim 1, wherein an apex angle of the intake side conical wall surface is substantially equal to that of a poppet valve head of the intake valve to more smoothly introduce intake air through between the intake valve and the intake valve seat.

23. The combustion chamber for an internal combustion engine of claim 2, wherein an apex angle of the exhaust side conical wall surface is substantially equal to that of a poppet valve head of the exhaust valve to more smoothly exhaust combustion gas through between the exhaust valve and the exhaust valve seat.

24. The combustion of chamber for an internal combustion engine of claim 1, wherein two intake valves are provided; and an ignition plug provided with two opposing spark gaps formed by two opposing side electrodes and a central cylindrical electrode is disposed at a boundary between the two intake side conical wall surfaces to effectively swirl ignited mixture.

25. The combination chamber for an internal combustion engine of claim 1, wherein said apex of said intake side conical wall surface lies on a line bisecting said intake valve.

26. The combination chamber for an internal combustion engine of claim 2, wherein said apex of said exhaust side conical wall lies on a line bisecting said exhaust valve.

* * * * *